US012568328B2

(12) United States Patent
Xue et al.

(10) Patent No.: US 12,568,328 B2
(45) Date of Patent: Mar. 3, 2026

(54) PIEZOELECTRIC VOICE ACCELEROMETER WITH BACK CAVITY AIR PRESSURE COUPLING AND MULTIPLE RESONANCE PEAKS

(71) Applicant: QUALCOMM Incorporated, San Diego, CA (US)

(72) Inventors: Shuwan Xue, Lexington, MA (US); Jong Soo Choi, Boston, MA (US); Robert John Littrell, Belmont, MA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 18/470,876

(22) Filed: Sep. 20, 2023

(65) Prior Publication Data

US 2025/0097630 A1 Mar. 20, 2025

(51) Int. Cl.
*H04R 1/24* (2006.01)
*H04R 1/04* (2006.01)
(Continued)

(52) U.S. Cl.
CPC ............... *H04R 1/245* (2013.01); *H04R 1/04* (2013.01); *H04R 1/08* (2013.01); *H04R 1/26* (2013.01);
(Continued)

(58) Field of Classification Search
CPC . H04R 1/245; H04R 1/04; H04R 1/08; H04R 1/26; H04R 17/02; H04R 17/10; H04R 2201/003
See application file for complete search history.

(56) References Cited

U.S. PATENT DOCUMENTS

2012/0207334 A1 8/2012 Ryan et al.
2017/0156002 A1 6/2017 Han et al.
(Continued)

FOREIGN PATENT DOCUMENTS

CN 113507676 A 10/2021
JP H08195995 A 7/1996
(Continued)

OTHER PUBLICATIONS

Partial International Search Report and Written Opinion—PCT/US2024/043909—ISA/EPO—Dec. 2, 2024.
(Continued)

*Primary Examiner* — Mark Fischer
(74) *Attorney, Agent, or Firm* — QUALCOMM Incorporated

(57) ABSTRACT

Systems and techniques are provided for detecting bone-conducted sound. A voice accelerometer can include a substrate and a plurality of sensing elements associated with a plurality of frequency bands. Each frequency band can be associated with one or more sensing elements of the plurality of sensing elements having a respective resonance frequency within the frequency band. The voice accelerometer can include a back cavity enclosed by the plurality of sensing elements and the substrate. Each respective sensing element of the plurality of sensing elements can be configured to vibrate in response to a first force corresponding to a bone-conducted sound wave coupled into the voice accelerometer, and a second force corresponding to a back cavity pressure coupling between the plurality of sensing elements, the back cavity pressure coupling based on respective vibration of each sensing element of the plurality of sensing elements.

29 Claims, 11 Drawing Sheets

(51) Int. Cl.
*H04R 1/08* (2006.01)
*H04R 1/26* (2006.01)
*H04R 17/02* (2006.01)
*H04R 17/10* (2006.01)

(52) U.S. Cl.
CPC ............. *H04R 17/02* (2013.01); *H04R 17/10* (2013.01); *H04R 2201/003* (2013.01)

(56) References Cited

U.S. PATENT DOCUMENTS

| | | | |
|---|---|---|---|
| 2019/0105011 A1 | 4/2019 | Kim et al. | |
| 2022/0317148 A1 | 10/2022 | Littrell | |
| 2023/0047687 A1 | 2/2023 | Zhou et al. | |
| 2023/0097786 A1* | 3/2023 | Leahy | H04R 1/2853 257/416 |
| 2023/0349862 A1 | 11/2023 | Zhou et al. | |

FOREIGN PATENT DOCUMENTS

| | | | |
|---|---|---|---|
| TW | 202211211 | A | 3/2022 |
| WO | 2022223041 | A1 | 10/2022 |

OTHER PUBLICATIONS

Hake A.E., “Piezoelectric MEMS Accelerometers for Sensing Ossicular Vibration”, The University of Michigan, 2021, 111 Pages.

International Search Report and Written Opinion—PCT/US2024/043909—ISA/EPO—Mar. 11, 2025.

* cited by examiner

PIEZOELECTRIC VOICE ACCELEROMETER WITH BACK CAVITY AIR PRESSURE COUPLING AND MULTIPLE RESONANCE PEAKS

FIELD

The present disclosure generally relates to audio signal processing. For example, aspects of the present disclosure relate to piezoelectric voice accelerometers (VAs), which may be used for certain functionality such as to implement bone conduction microphones (BCMs) based on sensing bone-conducted vibrations of the vocal cords.

BACKGROUND

In some examples, when a user speaks (e.g., generates a self-voice signal), the user's voice may travel along two paths, including an acoustic path and a bone conduction path. Acoustic microphones can be used to pick up an acoustic path-based input audio signal using the acoustic path. The acoustic path-based input audio signal can include the user's self-voice signal and may additionally include distortion patterns from external or background signals, noise, etc. A bone conduction microphone (BCM) can be used to pick up a bone conduction path-based input audio signal using the bone conduction path. The bone conduction path-based input audio signal can include the user's self-voice signal at an improved signal-to-noise ratio (SNR). For example, the bone conduction path-based input audio signal may include a lesser and/or negligible contribution from external or background signals, noise, etc.

Voice accelerometers (VAs) are devices that can be used to sense or detect human speech (e.g., a user voice) based on sensing the bone-conducted vibrations caused by the vocal cords. VAs may also be referred to as bone conduction microphones (BCMs) and/or can be used to implement BCMs. VAs are not designed to sense air-conducted sound, as a traditional acoustic microphone would. Instead, a VA can be designed to sense bone-conducted and/or soft tissue-conducted vibrations that are caused by, and propagate from, the user's vocal cords. To sense these bone or soft tissue-conducted vibrations, a VA can be coupled (e.g., brought into physical contact, either directly or indirectly) with some portion of the user's body. For instance, a VA can be placed directly on the skin, often on (or near) the head or neck.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

According to at least one illustrative example, a voice accelerometer for detecting bone-conducted sound within a plurality of frequency bands is provided. The voice accelerometer can include: a substrate; a plurality of sensing elements associated with the plurality of frequency bands, wherein each frequency band of the plurality of frequency bands is associated with a corresponding one or more sensing elements of the plurality of sensing elements, each of the corresponding one or more sensing elements being associated with a respective resonance frequency within a respective frequency band; and a back cavity enclosed by the plurality of sensing elements and the substrate, wherein a volume of the back cavity extends between the plurality of sensing elements and the substrate, and wherein each respective sensing element of the plurality of sensing elements is configured to vibrate in response to: a first force corresponding to a bone-conducted sound wave coupled into the voice accelerometer; and a second force corresponding to a back cavity pressure coupling between the plurality of sensing elements, the back cavity pressure coupling based on respective vibration of each sensing element of the plurality of sensing elements.

In another illustrative example, an apparatus of a bone conduction microphone is provided. The apparatus can include: a plurality of sensing elements associated with a plurality of frequency bands of a bone-conducted voice vibration range, each sensing element of the plurality of sensing elements corresponding to a respective frequency band of the plurality of frequency bands and associated with a resonance frequency within the respective frequency band; and a back cavity enclosed by the plurality of sensing elements and a substrate of the bone conduction microphone, wherein each respective sensing element of the plurality of sensing elements is configured to vibrate in response to: a first force corresponding to a bone-conducted sound wave coupled into the bone conduction microphone; and a second force corresponding to a back cavity pressure coupling between the plurality of sensing elements, the back cavity pressure coupling based on respective vibration of each sensing element of the plurality of sensing elements.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip examples or implementations, or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures.

DETAILED DESCRIPTION

Certain aspects and aspects of this disclosure are provided below. Some of these aspects and aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides exemplary aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the scope of the application as set forth in the appended claims.

Voice accelerometers (VAs) are devices that can be used to sense or detect human speech (e.g., voice) based on sensing the bone-conducted vibrations caused by the vocal cords. As used herein, a "VA" may also be referred to as bone conduction microphone (BCM) and/or can be used to implement a BCM. Whereas acoustic microphones are designed to generate an audio signal based on sensing air-conducted sound waves, VAs (e.g., and/or other BCMs) are designed to sense bone-conducted and/or soft tissue-conducted vibrations that are caused by, and propagate from, the user's vocal cords. To sense these bone or soft tissue-conducted vibrations, a VA can be coupled (e.g., brought into physical contact, either directly or indirectly) with some portion of the user's body. For instance, a VA can be placed directly on the skin, often on (or near) the user's head or neck.

In some examples, one or more VAs can be included in various wearable devices and/or other audio and/or electronic devices. For instance, one or more VAs can be included in wearable devices such as a pair of in-ear true wireless stereo (TWS) earbuds, AR/VR headsets, smart glasses, etc., and can be used to implement a BCM and/or to generate bone conducted audio signals that are used by the wearable device. In another example, one or more VAs can be used to provide covert communications, based on the VAs having a lower threshold of audibility or detectability of vocal sounds produced by a user. VAs may also be referred to as bone conduction microphones (BCMs), although VAs are not designed to sense air-conducted sound.

Figure 4:
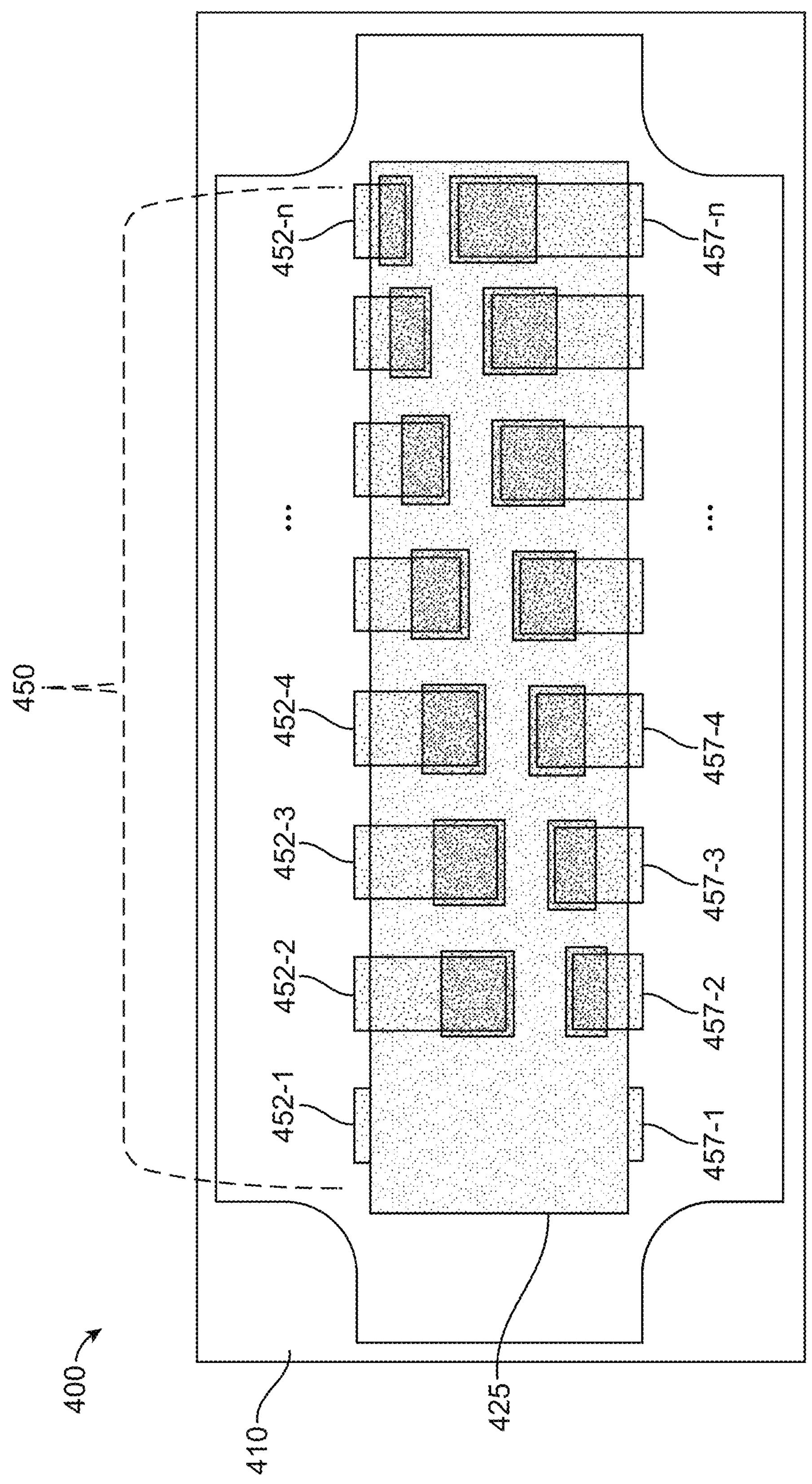
FIG. 4 is a diagram illustrating an example of a multi-band VA that can be used to implement a BCM using a plurality of sensing elements associated with different frequency bands and frequencies, in accordance with some examples.

In some examples, a VA can be implemented using a microelectromechanical systems (MEMS) accelerometer, and may be referred to as a "MEMS VA." In some cases, a MEMS VA can implement piezoelectric sensing, capacitive sensing, and/or a combination of the two. As used herein, a "piezoelectric MEMS VA" or "piezoelectric VA" can refer to a MEMS VA that implements piezoelectric sensing only (e.g., does not utilize capacitive sensing) and/or can refer to a MEMS VA that implements at least piezoelectric sensing (e.g., utilizes piezoelectric sensing, and may additionally utilize capacitive sensing). In one illustrative example, a piezoelectric MEMS VA can include one or more cantilevers, beams, or other sensing elements to sense and detect bone-conducted vibrations corresponding to a user's speech. For instance, FIG. 4 illustrates an example piezoelectric MEMS VA that includes a plurality of cantilever sensing elements (e.g., as will be described in greater detail below).

A "capacitive MEMS VA" or "capacitive VA" can refer a MEMS VA that implements capacitive sensing only (e.g., does not utilize piezoelectric sensing) and/or can refer to a MEMS VA that implements at least capacitive sensing (e.g., utilize capacitive sensing, and may additionally utilize piezoelectric sensing). In one illustrative example, a capacitive MEMS VA can include one or more capacitive accelerometers or other capacitive vibration sensors. The capacitive accelerometer can be used to sense and detect bone-conducted vibrations corresponding to a user's speech, based on detecting changes in electrical capacitance in response to acceleration. Accelerometers can utilize the properties of an opposed plate capacitor for which the distance between the opposed plates varies proportionally to applied acceleration, thus altering capacitance. This variable (e.g., changes in capacitance, indicative of changes in opposed plate distance) is used in a circuit to ultimately provide an output voltage signal that is proportional to the measured acceleration.

Voice accelerometers can also be implemented as non-MEMS VAs and/or can be implemented without using a MEMS accelerometer. For example, microphone-based VAs can utilize microphone-based capacitive sensing, where vibrations caused by the user's vocal cords are coupled into a proof mass on a housing. The vibration of the proof mass creates air-conducted sound that is captured by a conventional acoustic microphone.

Voice accelerometers implemented with piezoelectric MEMS technology (e.g., existing piezoelectric MEMS VA implementations) may have a relatively high noise floor of measurement. For instance, the noise floor represents a magnitude or threshold below which the piezoelectric MEMS VA is unable to distinguish bone-conducted sound measurements from random or external noise. In some examples, existing piezoelectric MEMS VA implementation may be associated with higher noise floors than the respective noise floors associated with various non-piezoelectric MEMS VA implementations (e.g., capacitive MEMS VAs, non-MEMS VAs, microphone-based VAs, etc.).

An additional challenge is associated with locating or positioning the resonance frequency (e.g., resonance peak) of existing piezoelectric MEMS VA implementations relative to the bone-conducted voice vibration frequency range (e.g., the range of voice vibration frequencies that can be bone-conducted above a detection threshold). In some examples, the bone-conducted voice vibration frequency range can include frequencies from 100 Hz-1 kHz. In some cases, the frequency range of the bone-conducted voice vibration (e.g., also referred to as the "voice band") can include frequencies below 100 Hz and/or frequencies above 1 kHz. For instance, the frequency range of bone-conducted voice vibration can be based at least in part on the respective BCM and/or VA implementation used to sense or detect the bone-conducted voice vibration frequencies. In some examples, the bone-conducted voice vibration range can be based on a location on the head where the vibrations are sensed (e.g., a location of the BCM or VA on the head or body). The bone-conducted voice vibration range can additionally be based on the respective noise floor of the BCM or VA implementation used to sense or detect the bone-conducted voice vibration frequencies. In some cases, the bone-conducted voice vibration range can correspond to the BCM or VA noise floor relative to the amplitude of the vibrations (e.g., the amplitude of the bone-conducted voice vibrations). For instance, in some examples of MEMS BCMs located at the ear, vibration energy above 1 kHz drops into the sensor's noise floor (e.g., the MEMS BCM noise floor) and may be undetectable. In some aspects, the systems and techniques described herein can be used to detect bone-conducted voice vibrations at frequencies greater than 1 kHz.

As noted above, some existing piezoelectric MEMS VA implementations may correspond to a bone-conducted voice vibration range between 100 Hz and 1 kHz, and an additional challenge can be associated with locating or positioning the resonance frequency (e.g., resonance peak) of the existing piezoelectric MEMS VA implementations relative to the bone-conducted voice vibration frequency range. For or instance, existing piezoelectric MEMS VA implementations may have a frequency response with a resonance peak that is located outside of the 100 Hz-1 kHz voice vibration band (e.g., greater than 1 kHz). The resonance peak of the frequency response is indicative of the resonance frequency where the piezoelectric MEMS VA exhibits the highest sensitivity. A piezoelectric MEMS VA with a resonance peak at 4 kHz will have higher sensitivity at frequencies near the 4 kHz resonance frequency and lower sensitivity at frequencies away from the 4 kHz resonance frequency.

A piezoelectric MEMS VA can be structured with multiple cantilevers. The cantilevers can form opposed sensing elements that are used to sense the vibrations caused by the user's vocal cords. Existing piezoelectric MEMS VA implementations may be configured with cantilevers having the same shape and dimensions as one another. The cantilevers of such an existing piezoelectric MEMS VA implementation may each be tuned to the same resonance frequency. The outputs of the cantilevers are summed together to form a single output, which has a single resonance peak, at the resonance frequency shared by all of the cantilevers (based on the cantilevers having the same shape and dimensions). In existing piezoelectric MEMS VA implementations, the cantilever shape and dimension are often selected to intentionally place the resonance peak outside of the voice vibration band. A piezoelectric MEMS VA implemented or configured with a single resonance peak within the voice vibration band would act as a narrow-band filter, significantly distorting the measured audio signal outside of the narrow-band frequency range (e.g., outside the width of the resonance peak).

Existing piezoelectric MEMS VA implementations may be configured with resonance frequencies outside of the 100 Hz-1 kHz voice vibration band in order to provide more even or consistent coverage (e.g., sensitivity to bone conducted vibrations and sound) within the voice vibration band. For instance, the voice vibration band is approximately 900 Hz wide, which is significantly wider than the resonance peak of existing piezoelectric MEMS VA implementations. In examples where the resonance peak is located within the voice vibration band, the measured bone conducted audio signal may exhibit clipping near the resonance frequency (e.g., based on the dynamic range of the piezoelectric MEMS VA). For example, locating the resonance peak within the voice vibration band can cause the piezoelectric MEMS VA to function as a bandpass or narrow band filter centered around the resonance frequency and with a bandwidth proportional to the width of the resonance peak (e.g., due to the increased sensitivity of the piezoelectric MEMS VA around its resonance frequency). Accordingly, existing piezoelectric MEMS VA implementations may often be configured to locate the resonance peak (e.g., the resonance frequency of the piezoelectric MEMS VA) outside of the bone-conducted voice vibration band in order to avoid the narrow band filtering effect. In some examples of existing piezoelectric MEMS VA implementations, the resonance peak (e.g., resonance frequency) may be set equal to approximately 4 kHz, so that the flat portion of the piezoelectric MEMS VA frequency response coincides with the voice band (e.g., between approximately 100 Hz-1 kHz). Greater sensitivity at and/or near the resonance peak can correspond to the piezoelectric MEMS VA detecting external (e.g., air-conducted) noises, competing speech, background noise, etc., each of which may be challenges associated with existing piezoelectric MEMS VA implementations.

There is a need for systems and techniques that can be used to implement a piezoelectric MEMS VA that addresses the above-noted challenges and more. For instance, the challenges described above can limit the use of existing piezoelectric MEMS VA implementations in voice enhancement and/or noise reduction audio signal processing techniques, as well as various other audio signal processing techniques where improved SNR is desirable or needed.

For instance, the relatively high noise floor of existing piezoelectric MEMS VA implementations is associated with correspondingly lower SNRs of the measured bone-conducted sound. There is a need for systems and techniques that can be used to implement a piezoelectric MEMS VA with a relatively lower noise floor and/or increased SNRs of the measured bone-conducted sound. Locating the resonance peak of existing piezoelectric MEMS VA implementations outside of the bone-conducted voice vibration band can cause increased pickup of unwanted external noise near the resonance peak (and outside of the target voice vibration band) due to the high sensitivity at and around the resonance peak. There is a further need for systems and techniques that can be used to implement a piezoelectric MEMS VA with resonance frequencies within the bone-conducted voice vibration band, without causing the piezoelectric MEMS VA to act as a narrow band filter or otherwise distorting the bone-conducted audio signal.

A multi-band piezoelectric MEMS voice accelerometer (VA) is described herein. The multi-band piezoelectric MEMS VA includes a plurality of sensing elements that can be used to implement a plurality of measurement bands (e.g., frequency ranges for measurement of bone-conducted sound), with each sensing element of the plurality of sensing elements having a different resonance peak (e.g., resonance frequency) within the bone-conducted voice vibration range of 100 Hz-1 kHz. Further details regarding the multi-band piezoelectric MEMS VA will be described with respect to the figures.

Figure 1:
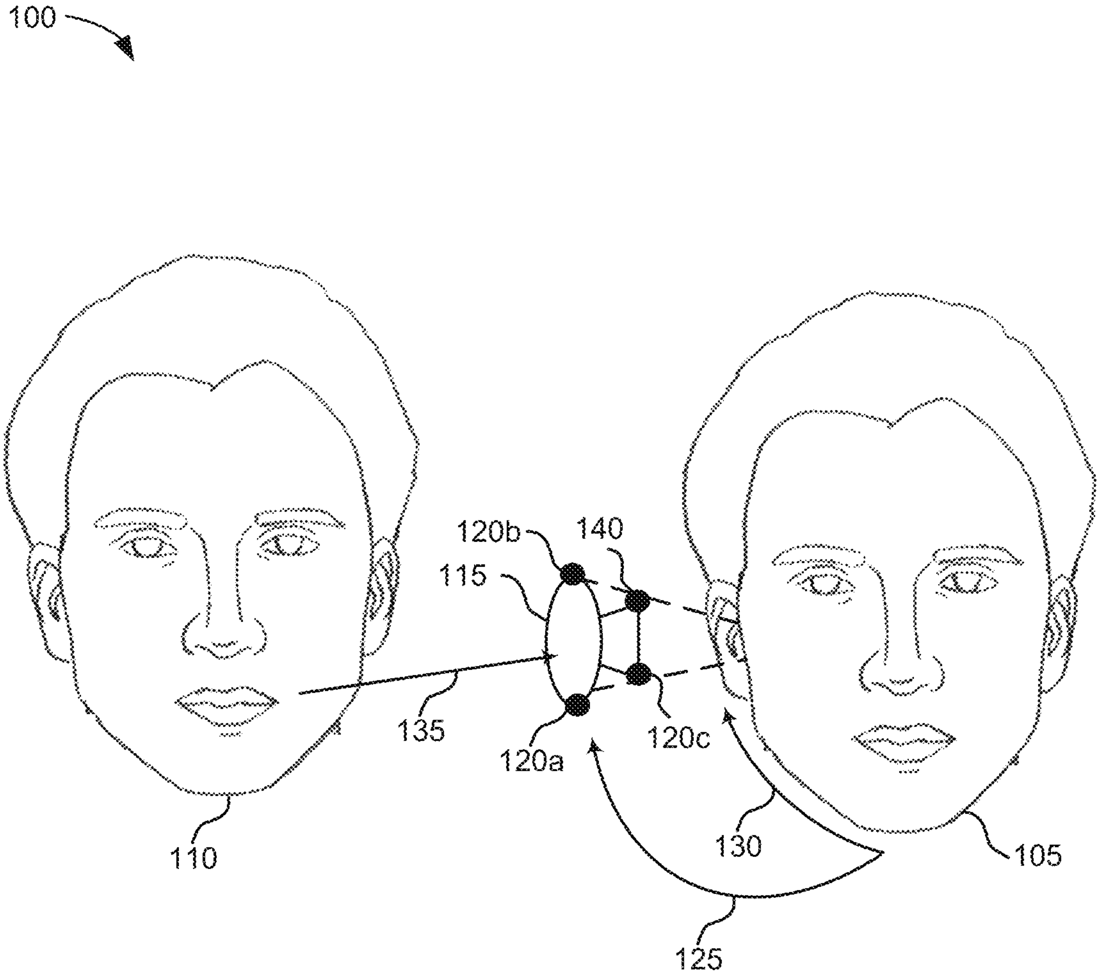
FIG. 1 is a diagram illustrating an example of an audio signaling using one or more bone conduction sensors, bone conduction microphones (BCMs), and/or voice accelerometers (VAs), in accordance with some examples.

FIG. 1 illustrates is a diagram illustrating an example of an audio signaling scenario 100 using one or more bone conduction sensors, bone conduction microphones (BCMs), and/or voice accelerometers (VAs), in accordance with some examples. For instance, the audio signaling scenario 100 may be associated with a user 105 using a wearable device 115 to experience a listen-through feature (e.g., among various other features and use cases that can be associated with and/or implemented using one or more BCMs or VAs).

For example, a user 105 may use a wearable device 115 (e.g., a wireless communication device, wireless headset, earbuds, in-ear true wireless stereo (TWS) earbuds, speaker, hearing assistance device, or the like), which may be worn by the user 105 in a hands-free manner. In some cases, the wearable device 115 may also be referred to as a hearing device. In some examples, the user 105 may continuously wear the wearable device 115, whether the wearable device 115 is currently in use (e.g., inputting an audio signal, outputting an audio signal, or both at one or more microphones 120) or not. In some examples, the wearable device 115 may include multiple microphones 120. For instance, the wearable device 115 may include one or more outer microphones 120, such as outer microphone 120*a* and outer microphone 120*b*. Wearable device 115 may also include one or more inner microphones 120, such as inner microphone 120*c*. The wearable device 115 may use the microphones 120 for noise detection, audio signal output, active noise cancellation, and the like. A wearable device (e.g., such as the wearable device 115) can include a greater or lesser number of microphones.

When the user 105 speaks, the user 105 may generate a unique audio signal (e.g., self-voice signal). For example, the user 105 may generate a self-voice signal that may travel along an acoustic path 125 (e.g., from the mouth of user 105 to the microphones 120 of the headset). The user 105 may also generate a self-voice signal that may follow a sound conduction path 130 created by vibrations via bone conduction between the vocal cords or mouth of the user 105 and the microphones 120 of the wearable device 115. In some examples, the wearable device 115 may perform self-voice activity detection (SVAD) based on the self-voice qualities. For instance, the wearable device 115 may identify inter channel phase and intensity differences (e.g., interaction between the outer microphones 120 and the inner microphones 120 of the wearable device 115). In some cases, the wearable device 115 may use the detected differences as qualifying features to contrast self-speech signals and external signals. For example, if one or more differences between channel phase and intensity between inner microphone 120*c* and outer microphone 120*a* are detected, or if one or more differences between channel phase and intensity between inner microphone 120*c* and outer microphone 120*a* satisfy a threshold value, then the wearable device 115 may determine that a self-voice signal is present in an input audio signal.

In some examples, the wearable device 115 may provide a listen-through feature for operating in a transparent mode. A listen-through feature may allow the user 105 to hear an output audio signal from the wearable device 115 as if the wearable device 115 were not present. The listen-through feature may allow the user 105 to wear the wearable device 115 in a hands-free manner regardless of the current use-case of the wearable device 115 (e.g., regardless of whether the wearable device 115 is outputting an audio signal, inputting an audio signal, or both using one or more microphones 120). For example, an audio source 110 (e.g., a person, audio from the surrounding environment, or the like) may generate an external audio signal 135. For example, a person may speak to the user 105, creating external audio signal 135. Without a listen-through feature, the external audio signal 135 may be blocked, muffled, or otherwise distorted by the wearable device 115. A listen-through feature may utilize outer microphone 120*a*, outer microphone 120*b*, inner microphone 120*c*, or a combination to receive an input audio signal (e.g., external audio signal 135), process the input audio signal, and output an audio signal (e.g., via inner microphone 120*c*) that sounds natural to the user 105 (e.g., sounds as if the user 105 were not wearing a device).

A self-voice audio signal following acoustic path 125 and the external audio signal 135 may have different distortion patterns. For instance, the external audio signal 135, self-voice audio signal following acoustic path 125, or both may have a first distortion pattern. But self-voice following sound conduction path 130, self-voice following acoustic path 125, or both may have a second distortion pattern. The microphones 120 of the wearable device 115 may detect the self-voice audio signal and the external audio signal 135 similarly. Thus, without different treatments for the different signal types, a user 105 may not experience a natural sounding input audio signal. That is, wearable device 115 may detect an input audio signal including a combination of external audio signal 135, self-voice via acoustic path 125, or self-voice via sound conduction path 130. Wearable device 115 may detect the input audio signal using the microphones 120.

In some examples, one or more (or all) of the microphones 120 can be implemented as bone conduction microphones (BCMs) and/or voice accelerometers (VAs). A BCM can include or utilize one or more VAs to detect the bone conducted voice of a user (e.g., the bone conducted self-voice signal). In some cases, the wearable device 115 can include one or more bone conduction sensors 140. The bone conduction sensor 140 can be the same as or similar to the microphones 120 that are implemented as BCMs or VAs. In some examples, the one or more bone conduction sensors 140 may be different from one or more of the microphones 120 and/or may be different from one or more BCMs or VAs used to implement the microphones 120. In some examples, the one or more bone conduction sensors 140 can be BCMs and/or VAs.

In some cases, a user 105 may experience bone conduction when speaking using wearable device 115. For example, bone conduction may be the conduction of sound to the inner ear through the bones of the skull, which may allow the user 105 to perceive audio (e.g., speech or self-voice, etc.) using vibrations in the bone. In some examples, bone may convey lower-frequency sounds better than higher-frequency sound. The bone conduction sensor 140 may include a transducer that outputs a signal based on the vibrations of the bone due to audio. Additionally or alternatively, the bone conduction sensor 140 may include any device (e.g., a sensor, or the like) that detects a vibration and outputs an electronic signal.

In some examples, the wearable device 115 may receive an input audio signal from outer microphone 120*a*, outer microphone 120*b*, or both (e.g., an external audio signal 135, the self-voice of the user 105, or both) and an input audio signal from an inner microphone 120*c*. The wearable device 115 may output an audio signal (e.g., the bone conduction signal) to a speaker or other audio device (e.g., including various speakers or audio playback devices the user 105 can hear, etc.).

Figure 2:
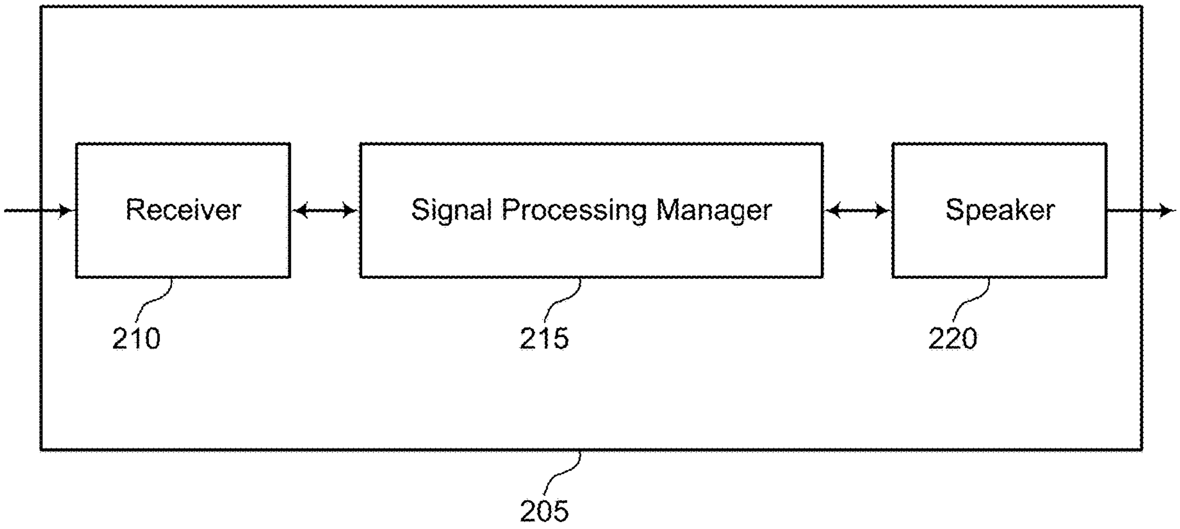
FIG. 2 is a diagram illustrating an example of a wearable device that can be used to perform audio signal processing using one or more VAs to sense bone conducted voice or speech signals using one or more audio frequency bands within the voice vibration frequency range of human speech, in accordance with some examples.

FIG. 2 is a diagram illustrating an example of a wearable device 205 that can be used to perform audio signal processing using one or more voice accelerometers (VAs) to sense bone conducted voice or speech signals using one or more audio frequency bands within the voice vibration frequency range of approximately 100 Hertz (Hz) to 1 kilohertz (kHz), in accordance with some examples. In some cases, the wearable device 205 may be an example of aspects of a wearable device 115 of FIG. 1. The wearable device 205 may include a receiver 210, a signal processing manager 215, and a speaker 220. The wearable device 205 may also include a processor. Each of these components may be in communication with one another (e.g., via one or more buses).

The receiver 210 may receive audio signals from a surrounding area (e.g., via an array of microphones, including one or more VAs for sensing bone conducted voice or speech signals). Detected audio signals may be passed on to other components of the wearable device 205. The receiver 210 may utilize a single antenna or a set of antennas to communicate wirelessly with other devices and/or may utilize one or more wired connections to communicate with other devices.

The signal processing manager 215 may receive, at the wearable device 205 including at least one VA for bone conducted audio sensing, a corresponding one or more bone conducted audio signals. The bone conducted audio signals can correspond to the voice or speech of a user of the wearable device 205. In some cases, the bone conducted audio signals may be received in one or more frequency bands and/or using one or more frequency band groups or subsets of the voice vibration frequency range between 100 Hz-1 kHz.

The actions performed by the signal processing manager 215 as described herein may be implemented to realize one or more potential advantages. One implementation may enable a wearable device (e.g., wearable device 115 of FIG. 1, wearable device 205 of FIG. 2, etc.) to use a signal output of a VA or other bone conduction sensor to account for self-voice in an audio signal. The VA can be used to obtain a bone conducted audio signal (e.g., a bone conducted self-voice signal) of the user, which can be used for various downstream audio processing and/or audio output tasks, etc. For instance, the bone conducted audio signal can be used to implement filtering of one or more acoustic audio signals (e.g., non-bone conducted audio signals obtained from acoustic microphones), to provide a transparent mode to the user, to allow for a natural sounding self-voice as an output of the wearable device, to perform various other voice enhancement audio signal processing operations, and/or to perform various other noise reduction operations, etc., among various others. Using one or more VAs to generate or sense bone conducted self-voice signals of the user, a processor of a wearable device (e.g., a processor controlling the receiver 210, the signal processing manager 215, the speaker 220, or a combination thereof) may improve user experience.

The signal processing manager 215, or its sub-components, may be implemented in hardware, code (e.g., software or firmware) executed by a processor, or any combination thereof. If implemented in code executed by a processor, the functions of the signal processing manager 215, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The signal processing manager 215, or its sub-components, may be physically located at various positions, including being distributed such that portions of functions are implemented at different physical locations by one or more physical components. In some examples, the signal processing manager 215, or its sub-components, may be a separate and distinct component in accordance with various aspects of the present disclosure. In some examples, signal processing manager 215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The speaker 220 may provide output signals generated by other components of the wearable device 205. In some examples, the speaker 220 may be collocated with one or more microphones (e.g., BCMs, VAs, and/or acoustic microphones) of wearable device 205.

Figure 3:
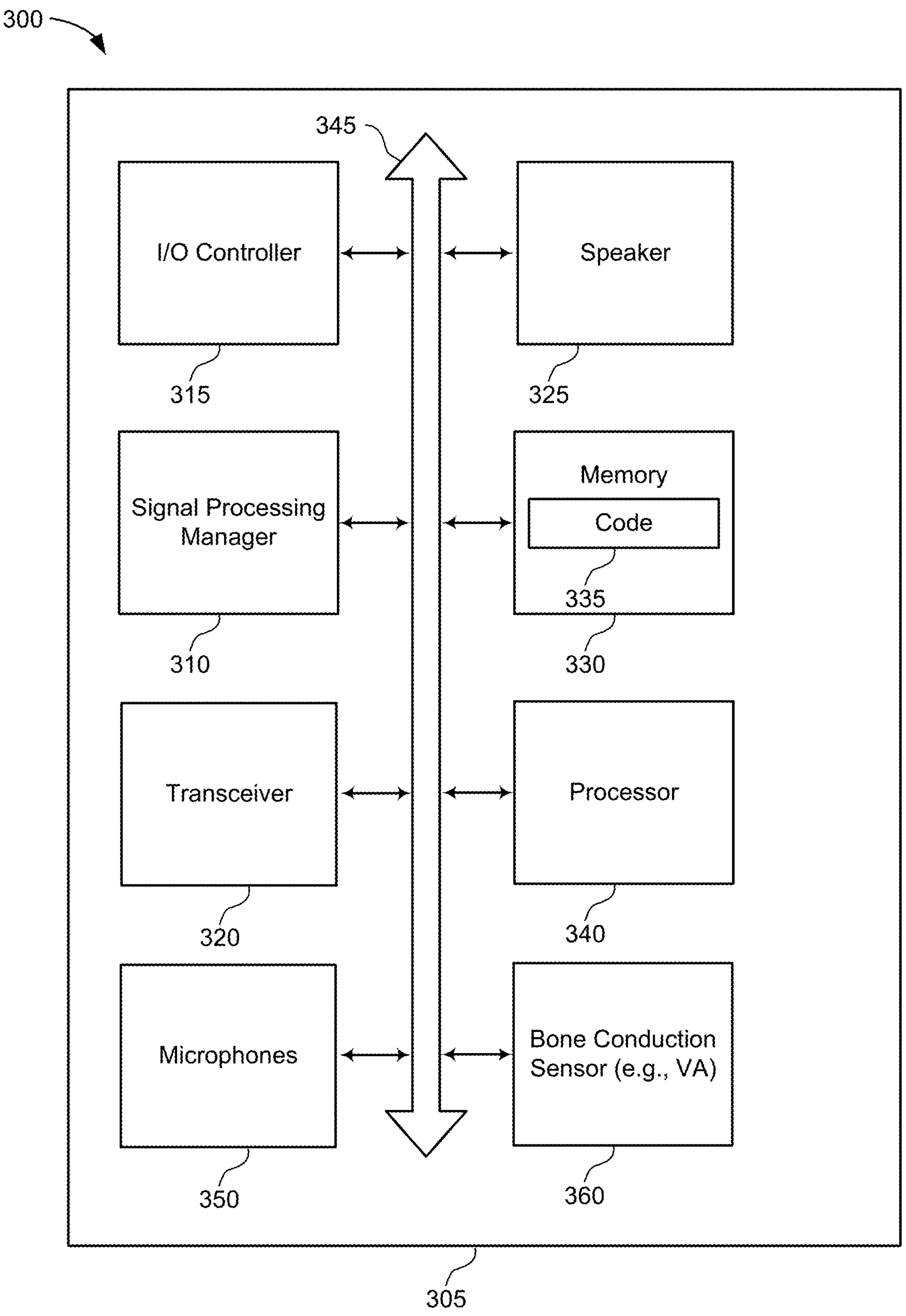
FIG. 3 is a diagram of an example audio signal processing system including a wearable device with one or more VAs for sensing bone conducted voice or speech signals, in accordance with some examples.

FIG. 3 is a diagram of an example audio signal processing system 300 including a wearable device 305 with one or more VAs for sensing bone conducted voice or speech signals, in accordance with some examples. For instance, the example audio processing system 300 can be used to perform audio signal processing using one or more VAs to sense bone conducted voice or speech signals using one or more audio frequency bands within the voice vibration frequency range of approximately 100 Hertz (Hz) to 1 kilohertz (kHz), in accordance with some examples.

The wearable device 305 may be an example of or include the components of wearable device 115 of FIG. 1, wearable device 205 of FIG. 2, etc. The wearable device 305 may include components for bi-directional voice and data communications including components for transmitting and receiving communications, including a signal processing manager 310, an input/output (I/O) controller 315, a transceiver 320, memory 330, and a processor 340. These components may be in electronic communication via one or more buses (e.g., bus 345).

The signal processing manager 310 may receive, at the wearable device including at least one VA 360 (e.g., or other bone conduction sensor for bone conducted audio sensing), a corresponding one or more bone conducted audio signals. The bone conducted audio signals can correspond to the voice or speech of a user of the wearable device 205. In some cases, the bone conducted audio signals may be received in one or more frequency bands and/or using one or more frequency band groups or subsets of the voice vibration frequency range between 100 Hz-1 kHz. In some cases, the wearable device 305 can additionally include one or more microphones 350, which may be provided as acoustic (e.g., non-bone conduction) microphones. In some examples, the signal processing manager 310 can receive acoustic audio signals from the one or more acoustic microphones 350 and can receive one or more bone conducted audio signals from the one or more VAs 360.

The I/O controller 315 may manage input and output signals for the wearable device 305. The I/O controller 315 may also manage peripherals not integrated into the wearable device 305. In some cases, the I/O controller 315 may represent a physical connection or port to an external peripheral. In some cases, the I/O controller 315 may utilize an operating system such as iOS®, ANDROID®, MS-DOS®, MS-WINDOWS®, OS/2®, UNIX®, LINUX®, or other known operating system(s). In some examples, the I/O controller 315 may represent or interact with a modem, a keyboard, a mouse, a touchscreen, or a similar device. In some cases, the I/O controller 315 may be implemented as part of a processor. In some cases, a user may interact with the wearable device 305 via the I/O controller 315 or via hardware components controlled by the I/O controller 315.

The transceiver 320 may communicate bi-directionally, via one or more antennas, wired, or wireless links. For example, the transceiver 320 may represent a wireless transceiver and may communicate bi-directionally with another wireless transceiver. The transceiver 320 may also include a modem to modulate the packets and provide the modulated packets to the antennas for transmission, and to demodulate packets received from the antennas. In some examples, listen-through features implemented using the one or more VAs 360 and corresponding bone conducted audio signals (e.g., bone conducted self-voice signals) described above may allow a user to experience natural sounding interactions with an environment while performing wireless communications or receiving data via transceiver 320.

The speaker 325 may provide an output audio signal to a user (e.g., with or without listen-through features and/or with or without combining the bone conducted audio signal(s) from the one or more VAs 360 with the acoustic audio signal(s) from the one or more acoustic microphones 350 if present).

The memory 330 may include random-access memory (RAM) and read-only memory (ROM). The memory 330 may store computer-readable, computer-executable code 335 including instructions that, when executed, cause the processor to perform various functions described herein. In some cases, the memory 330 may contain, among other things, a basic I/O system (BIOS) which may control basic hardware or software operation such as the interaction with peripheral components or devices.

The processor 340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In other cases, a memory controller may be integrated into the processor 340. The processor 340 may be configured to execute computer-readable instructions stored in a memory (e.g., the memory 330) to cause the wearable device 305 to perform various functions (e.g., functions or tasks supporting ASVN using a bone conduction sensor).

The code 335 may include instructions to implement aspects of the present disclosure, including instructions to support signal processing. In some cases, aspects of the signal processing manager 310, the I/O controller 315, and/or the transceiver 320 may be implemented by portions of the code 335 executed by the processor 340 or another device. The code 335 may be stored in a non-transitory computer-readable medium such as system memory or other type of memory. In some cases, the code 335 may not be directly executable by the processor 340 but may cause a computer (e.g., when compiled and executed) to perform functions described herein.

As previously noted, systems and techniques are described herein for a multi-band piezoelectric MEMS voice accelerometer (VA) that includes a plurality of sensing elements that can be used to implement a plurality of measurement bands (e.g., frequency ranges for measurement of bone-conducted sound), each sensing element having a different resonance peak (e.g., resonance frequency) within the bone-conducted voice vibration range of 100 Hz-1 kHz relative to the other sensing element.

FIG. 4 is a diagram illustrating an example of a multi-band piezoelectric MEMS VA 400 that includes a plurality of sensing elements associated with a plurality of different frequency bands within the bone-conducted voice vibration range. In one illustrative example, the plurality of sensing elements can be provided as a plurality of cantilevers 450 having different dimensions and/or masses. As will be described in greater detail below, the resonance frequency of a particular cantilever 450 can be based on factors such as the physical dimensions of the cantilever, the mass or proof mass of the cantilever, etc. In some aspects, the multi-band piezoelectric MEMS VA 400 can measure bone-conducted sound for a plurality of frequency bands within the bone-conducted voice vibration range, where each frequency band comprises a subset of the bone-conducted voice vibration range. The plurality of frequency bands can be overlapping or can be non-overlapping.

For instance, the 100 Hz-1 kHz voice vibration range can be divided into nine non-overlapping frequency bands that are each 100 Hz wide. In another example, the 100 Hz-1 kHz voice vibration range can be divided into nine overlapping frequency bands 120 Hz wide (e.g., an overlap of 10 Hz between adjacent frequency bands).

Each frequency band implemented by the multi-band piezoelectric MEMS VA 400 can be associated with one or more sensing elements for measuring bone-conducted vibrations or sound. For instance, in one illustrative example, each frequency band implemented by the multi-band piezoelectric MEMS VA 400 can be associated with one or more of the cantilevers 450. The cantilever(s) 450 associated with a particular frequency band can have individual resonance frequencies that are located within the particular frequency band. For example, a frequency band corresponding to the 200-300 Hz subset of the voice vibration range can include one or more cantilevers 450 having respective resonance frequencies between 200-300 Hz.

In some cases, each cantilever of the one or more cantilevers 450 associated with a particular frequency band can have the same resonance frequency (e.g., one resonance peak per frequency band). For instance, each cantilever 450 associated with a 200-300 Hz frequency band can have the same resonance frequency (e.g., such as 250 Hz). Individual ones of the cantilevers 450 that have the same resonance frequency can be identical to one another or can be different from one another. Cantilevers with different physical properties but the same resonance frequency can be provided based on modifying multiple physical properties of the cantilever. For instance, modifying a first physical property of a cantilever (e.g., length, cross-sectional area, etc.) can shift the resonance frequency in a first direction and modifying a second physical property of the cantilever (e.g., mass or proof mass) can shift the resonance frequency in a second direction opposite the first. For example, a shorter cantilever can have a greater resonance frequency than a longer cantilever, etc.

In some examples, at least a portion of the cantilevers 450 associated with a particular frequency band can have different resonance frequencies. For instance, at least a portion of cantilevers associated with a 200-300 Hz frequency band can be associated with different respective resonance frequencies between approximately 200-300 Hz. In some aspects, each cantilever associated with a particular frequency band of the multi-band piezoelectric MEMS VA 400 can have a different resonance frequency (e.g., corresponding to multiple resonance peaks within the particular frequency band). In some aspects, a total or combined frequency response of the one or more cantilevers 450 associated with a particular frequency band can exhibit a combined resonance peak that is located within the particular frequency band. For instance, FIG. 7 includes a graph 700 depicting the individual frequency responses of each cantilever of a plurality of cantilevers included in a multi-band piezoelectric MEMS VA, and a graph 750 depicting the combined frequency response 752 of the multi-band piezoelectric MEMS VA (described in greater detail below).

In one illustrative example, the plurality of cantilevers 450 includes a first set of cantilevers 452-1, 452-2, 452-3, 452-4, . . . , 452-*n* and a second set of cantilevers 457-1, 457-2, 457-3, 457-4, . . . , 457-*n*. In some aspects, the first set of cantilevers and the second set of cantilevers can both include the same number of cantilever sensing elements (e.g., n, where the plurality of cantilevers 450 includes 2*n cantilever sensing elements).

In some cases, the first set of cantilevers and the second set of cantilevers can extend through an empty volume (e.g., an air volume) 425 within the multi-band piezoelectric MEMS VA 400. As used herein, the empty volume 425 may also be referred to as a "back cavity." For example, the back cavity 425 shown in the top-down view of FIG. 4 can be the same as or similar to the back cavity 525 shown in the perspective view of FIG. 5B (e.g., and multi-band piezoelectric MEMS VA 400 of FIG. 4 can be the same as or similar to multi-band piezoelectric MEMS VA 500*b* of FIG. 5B). In some aspects, the plurality of cantilevers 450 can divide the empty volume (e.g., air volume) 425 into a first portion and a second portion. For instance, the first portion of the empty volume 425 can be located below the plurality of cantilevers 450 (e.g., into the page in the example of FIG. 4) and the second portion of the empty volume 425 can be located above the plurality of cantilevers 450 (e.g., out of the page in the example of FIG. 4). In some examples, the first and second portions of the empty volume 425 are located on opposite sides of the plurality of cantilevers 450. In some cases, a "back cavity" volume can refer to the portion of the empty volume 425 that is below the plurality of cantilevers 450. A "front cavity" volume can refer to the portion of the empty volume 425 that is above the plurality of cantilevers 450. In some cases, the back cavity volume and the front cavity volume may be lumped together, and may be collectively referred to as the "back cavity" or "back cavity volume."

Each cantilever of the plurality of cantilevers 450 can be coupled to a substrate 410 of the multi-band piezoelectric MEMS VA 400 at a first distal end of the cantilever. In some examples, the substrate 410 can include a silicon die frame (e.g., located at or around the perimeter of the substrate 410). The second distal end of each respective cantilever can extend away from the substrate 410, into and/or through the back cavity 425. Based on attaching one end of each cantilever 450 to substrate 410, the remaining length of the cantilever (e.g., towards the second end of the cantilever) is left free to vibrate or oscillate in response to bone-conducted sound that is coupled into the multi-band piezoelectric MEMS VA during operation.

In some aspects, the first set of cantilevers (e.g., 452-1, . . . , 452-*n*) can be attached to the substrate 410 along a first longitudinal edge of the back cavity 425, and the second set of cantilevers (e.g., 457-1, . . . 457-*n*) can be attached to the substrate 410 along a second longitudinal edge of the back cavity 425. The first and second longitudinal edges of back cavity 425 can be opposite one another, and the first set of cantilevers can extend across back cavity 425 towards the second set of cantilevers, and vice versa.

In one illustrative example, the lengths of the plurality of cantilevers can be selected such that the range of lengths (from shortest to longest) covers the entirety of the voice vibration range (from 100 Hz to 1 kHz). In some aspects, the lengths, dimensions, shapes, masses, etc., of the plurality of cantilevers 450 can be selected and/or tuned to configure the multi-band piezoelectric MEMS VA 400 with a plurality of different resonance peaks spread across (e.g., within) the voice vibration band of 100 Hz-1 kHz. In some cases, the plurality of cantilevers 450 can be tuned to evenly cover some (or all) of the voice vibration band with different resonance peaks (e.g., the separation between adjacent resonance peaks can be equal). In some examples, the plurality of cantilevers 450 can be tuned to include a greater quantity of resonance peaks and/or a smaller separation between adjacent resonance peaks for portions of the voice vibration band corresponding to frequency ranges of interest or importance.

In some aspects, the plurality of cantilevers 450 can be tuned and/or configured as high-value Q factor bandpass filters at different frequencies (e.g., where each bandpass filter has a passband centered around the resonance peak of a particular cantilever 450 of the MEMS VA 400). For instance, the resonance frequency (e.g., and corresponding resonance peak) of a respective cantilever (e.g., of one or more cantilevers of the plurality of cantilevers 450) can be adjusted by one or more of: changing the length of the cantilever, changing the mass/proof mass of the cantilever, changing the beam shape of the cantilever, etc. In some examples, the resonance frequency (e.g., and corresponding resonance peak) of a respective cantilever can be adjusted based on increasing or decreasing a thickness of the cantilever (e.g., where thickness of a respective cantilever of the plurality of cantilevers 450 is measured into/out of the page in the view of FIG. 4). In some aspects, the resonance frequency (e.g., and the corresponding resonance peak) of a respective cantilever can be adjusted based on the material composition(s) used for the cantilever, such that cantilevers with a same or similar physical size and/or dimension(s) can be implemented with different resonance frequencies and/or arrangements. For instance, increasing or decreasing the stiffness of the cantilever (e.g., by using different material compositions) can increase or decrease the resonance frequency/resonance peak of the cantilever.

In some examples, cantilever 452-1 can have a smaller resonance frequency than cantilever 457-1, based on cantilever 452-1 having a greater length. Cantilever 452-1 can have a smaller resonance frequency than each of the remaining cantilevers 452-2, . . . , **452-*n* of the first set of cantilevers, based on cantilever 452-1 being the longest cantilever in the first set. Similarly, cantilever 457-1 can have a larger resonance frequency than each of the remaining cantilevers 457-2, . . . , 457-*n* of the second set of cantilever, based on cantilever 457-1** being the shortest cantilever in the second set.

In some aspects, the first set of cantilevers (e.g., 452-1, . . . , **452-*n*) and the second set of cantilevers (e.g., 457-1, . . . , 457-*n*) can include the same quantity of cantilevers having the same respective resonance frequencies. For instance, at least a portion of the cantilevers included in the first set may have a corresponding cantilever in the second set with the same resonance frequency. In the example of FIG. 4, the cantilever 452-1 can be the same as or similar to the cantilever 457-*n* and may share the same resonance frequency. The cantilevers 452-2 and 457-(*n*−1) may be the same or similar as one another and share a common resonance frequency, etc. The cantilever 457-1 and 452-*n* may be the same as or similar to one another and share a common resonance frequency, etc. While the example of FIG. 4 depicts a multi-band MEMS VA configured with two cantilevers at each respective length or resonance frequency associated with the multi-band MEMS VA 400, a greater or lesser number of cantilevers may also be provided at each respective length and/or resonance frequency associated with the multi-band MEMS VA 400 and the plurality of cantilevers 450**.

In some cases, varying the physical geometry and/or physical properties of the cantilevers 450 can be used to tune the frequency response of the MEMS VA 400 within the voice vibration band. For example, each cantilever can be used to implement a different band (e.g., sub-band of the 100 Hz-1 kHz voice vibration band), where the plurality of cantilevers 450 can be used to implement a corresponding plurality of bands for capturing vocal cord vibrations using the MEMS VA 400. Individual bands can be tuned by varying the design of the corresponding cantilever. In one illustrative example, configuring the plurality of cantilevers 450 with different resonance peaks (e.g., each corresponding to a different bandpass filter band or frequency range around the resonance peak) can be used to implement multiple frequency bands for audio signal processing performed within the voice vibration range of 100 Hz-1 kHz. In some aspects, the multi-band MEMS VA 400 can use the plurality of cantilevers to obtain multi-band bone-conducted sound signals that can be provided to various downstream or subsequent multi-band sound processing operations (e.g., to improve, equalize, etc., the output of the MEMS VA 400). For instance, the multi-band MEMS VA 400 can provide multi-band sound data to a DSP and/or SoC associated with a downstream signal processing stage. As noted above, in some cases each cantilever of the plurality of cantilevers 450 can correspond to a different band of the multi-band data. In another example, each band of the multi-band data can correspond to a respective subset of the plurality of cantilevers 450, etc.

In some examples, the physical shape, dimensions, and/or geometry of the plurality of cantilevers 450 can be tuned or adjusted to provide a greater or lesser degree of overlap between the respective resonance peaks of adjacent cantilevers. In some cases, the MEMS VA 400 may include a greater percentage of cantilevers associated with one or more frequencies of interest. For instance, the MEMS VA 400 may include a greater percentage of relatively short cantilevers, which have resonance peaks in the higher frequencies. In such examples, the MEMS VA 400 may be implemented with a relatively increased quantity of frequency bands in the frequencies of interest (e.g., higher frequencies) of the voice vibration range. In another example, a separation distance (e.g., gap) between adjacent cantilevers can be varied along the longitudinal axis of the back cavity 425. For instance, the cantilevers can be spaced closer together (e.g., smaller inter-cantilever spacing or gap between adjacent cantilevers) as the cantilevers become shorter in length and their respective resonance frequencies increase. For example, the separation gap between cantilevers 452-1 and 452-2 can be larger than the separation gap between cantilevers 452-2 and 452-3; the separation gap between cantilevers 452-2 and 452-3 can be larger than the separation gap between cantilevers 452-3 and 452-4; etc. In another example, the separation gap between cantilevers 457-4 and 457-3 can be larger than the separation gap between cantilevers 457-3 and 457-2; the separation gap between cantilevers 457-3 and 457-2 can be larger than the separation gap between cantilevers 457-2 and 457-1; etc.

In some aspects, the resonance characteristics of the cantilevers 450 can also be tuned by adjusting the damping of the respective cantilever. For example, a cantilever with relatively little damping will exhibit a relatively sharp resonance peak (e.g., rapid drop-off in sensitivity immediately to the left and right of the resonance peak, corresponding to frequencies lower and higher than the resonance frequency). By increasing the damping of a cantilever, the sharpness of the resonance peak can be reduced, and the effective band or bandwidth of the cantilever is widened. For instance, in the approximation of a cantilever as a high-value Q factor bandpass filter, increasing damping of the cantilever resonance increases the width of the passband. The Q factor (quality factor) is a dimensionless parameter that describes the damping of an oscillator or resonator. For example, the Q factor can be the ratio of initial energy stored in a resonator to energy lost in one vibration cycle of the resonator. A low Q factor represents a large amount of energy loss per vibration cycle. A low Q factor resonator is strongly damped, and the oscillation dies out rapidly. A high Q factor represents a smaller amount of energy loss per vibration cycle. A high Q factor resonator is weakly damped, and the oscillation dies out more gradually.

In some cases, each cantilever of the plurality of cantilevers 450 may operate independently from the remaining cantilevers of the plurality of cantilevers 450. For example, cantilever 452-1 may operate independently from any of cantilevers 452-2, . . . , 452-*n* and/or any of cantilevers 457-1, . . . , 457-*n*.

Figure 5A:
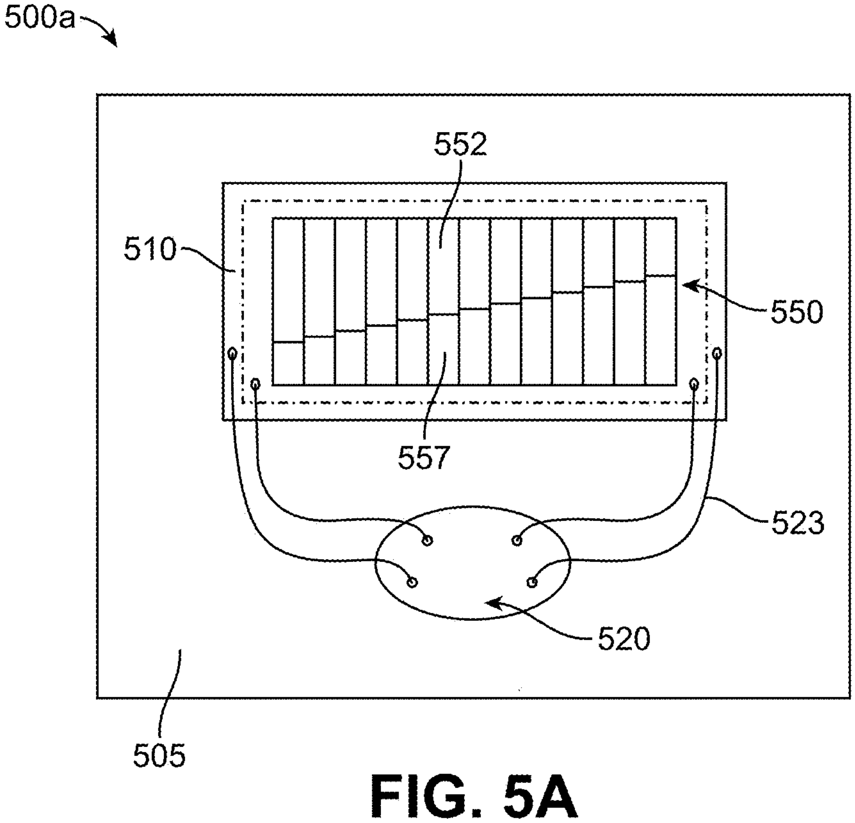
FIG. 5A is a diagram illustrating a top-down view of an example multi-band VA that includes a plurality of sensing elements associated with different frequencies and coupled through a back cavity air pressure of the multi-band VA, in accordance with some examples.
Figure 5B:
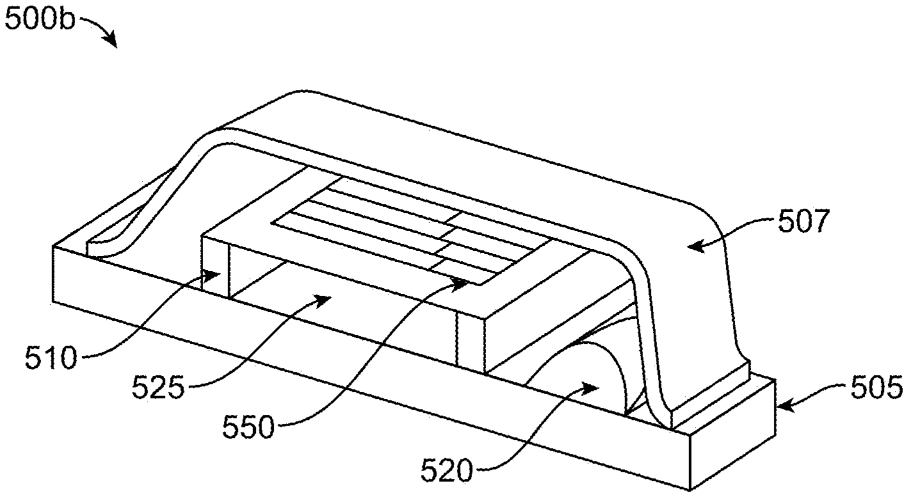
FIG. 5B is a diagram illustrating a cutaway perspective view of the example multi-band VA of FIG. 5A, in accordance with some examples.

In one illustrative example, the plurality of cantilevers 450 can be coupled through a back cavity air pressure of the back cavity 425 of FIG. 4 and/or the back cavity 525 of FIG. 5B. For instance, by carefully selecting the back cavity 425 size and the separation distance (e.g., gaps) between adjacent ones of the plurality of MEMS cantilevers 450, the tightly arranged cantilevers 450 can be coupled to one another by the dynamic air pressure in the back cavity 425. For instance, the separation distance or gap between adjacent cantilevers can be controlled such that the oscillation of the cantilevers into or out of the back cavity 425 creates instantaneous pressure differentials between the back cavity (e.g., below the cantilevers) and the front cavity (e.g., above the cantilevers). In some aspects, pressure forces associated with the dynamic air pressure of the back cavity 425 can be used to couple the plurality of cantilevers 450 to one another. The coupling can be referred to herein as "back cavity coupling." In some examples, the back cavity coupling of the plurality of cantilevers 450 can be associated with a respective damping force acting on each cantilever of the plurality of cantilevers 450, where each cantilever's respective damping force is based on the same (instantaneous) dynamic air pressure in the back cavity 425. In one illustrative example, the back cavity coupling can be used to implement optimal damping of the respective cantilevers of the plurality of cantilevers 450, for instance based on the interaction of the back cavity air flow through (e.g., into or out of) the separation or gaps between adjacent cantilevers.

In one illustrative example, the oscillation of each cantilever of the plurality of cantilevers 450 causes a corresponding change in volume of the back cavity 425 (e.g., the cantilever moving away from the bottom of the back cavity 425 temporarily increases the volume; the cantilever moving towards the bottom of the back cavity 425 temporarily decreases the volume). The changes in volume can be combined over the plurality of cantilevers 450 to obtain an instantaneous back cavity volume that fluctuates, driving a corresponding fluctuation or change in the back cavity air pressure. The changes in back cavity air pressure correspond to changes in the back cavity air pressure force that acts on each cantilever of the plurality of cantilevers 450, and the movement of each respective cantilever of the plurality of cantilevers 450 is coupled to each respective remaining cantilever of the plurality of cantilevers 450.

For example, FIG. 5A is a diagram illustrating a top-down view of an example multi-band piezoelectric MEMS VA 500*a* that includes a plurality of sensing elements associated with different resonant frequencies and coupled through a back cavity air pressure of the multi-band VA, in accordance with some examples. FIG. 5B is a diagram illustrating a cutaway perspective view 500*b* of the example multi-band VA of FIG. 5A, in accordance with some examples.

In some cases, the multi-band MEMS VA 500 of FIGS. 5A and 5B can be the same as or similar to the multi-band VA 400 of FIG. 4. The multi-band MEMS VA 500 can include a plurality of sensing elements (e.g., cantilevers) 550 that may be the same as or similar to the plurality of sensing elements (e.g., cantilevers) 450 of FIG. 4. For example, the plurality of sensing elements 550 can include a first set of sensing elements 552 and a second set of sensing elements 557. In some aspects, the first and second sets of sensing elements (e.g., 552 and 557, respectively) can be cantilever or beam sensing elements, and may be the same as or similar to the respective first set of cantilevers 452-1, . . . , 452-*n* and second set of cantilevers 457-1, . . . , 457-*n* of FIG. 4.

The plurality of cantilevers 550 can be connected (e.g., via communication paths 523) to an Application-Specific Integrated Circuit (ASIC) 520 included in the multi-band MEMS VA 500. For example, the ASIC 520 can be used to implement various audio signal processing operations using one or more bone-conducted sound signals determined by the plurality of cantilevers 550 of multi-band MEMS VA 500. In some aspects, ASIC 520 can receive an input bone-conducted sound signal from the plurality of cantilevers 550, where the input bone-conducted sound signal includes a plurality of different sub-bands of the voice vibration band (e.g., where each sub-band is associated with one or more cantilevers having resonance frequencies located with the particular sub-band, as described previously above). In one illustrative example, the multiple outputs of the plurality of cantilevers 550 can be connected using a particular configuration that is designed to be matched with one or more inputs of an ASIC (e.g., such as ASIC 520). An example configuration for connecting the plurality of cantilevers 550 to an ASIC will be described below with respect to FIGS. 6A-C.

The multi-band MEMS VA 500 can be coupled to a substrate 510 and a printed circuit board 505. A lid 507 can be attached to the upper surface of PCB 505 and enclose the plurality of cantilevers 550 and the ASIC 520. In one illustrative example, the back cavity 525 can be the empty or enclosed volume defined between the vertical walls of substrate 510 (and/or the planar horizontal surface of PCB 505) and the plurality of cantilevers 525. For instance, in the example of FIG. 5A, the location of the inner sides of the vertical walls of substrate 510 are shown as the four dashed lines around the perimeter of the plurality of cantilevers 550. In some examples, a volume enclosed by lid 507 can additionally contribute to the back cavity coupling of the plurality of cantilevers 550. For instance, the compliances of the two volumes can act in parallel, with the "stiffer" of the two (e.g., the back cavity 525 volume enclosed by the cantilevers 550, vertical walls of substrate 510, and upper surface of PCT 505) dominating. In some aspects, the enclosed volume of back cavity 525 can be configured to yield a good coupling (e.g., back cavity coupling) of the plurality of cantilevers 550. For instance, in some examples, the back cavity 525 may have dimensions of 1 mm×0.5 mm×0.25 mm (e.g., L×W×H). In some aspects, the back cavity 525 is separated from the volume within lid 507 (e.g., the front cavity volume) based on decreasing the separation distance between adjacent ones of the plurality of cantilevers 550, as described previously above. In some cases, the separation distance of the gaps between adjacent cantilevers 550 can be used to influence the damping forces acting upon the individual cantilevers. For instance, decreasing the separation distance to reduce the gap between adjacent cantilevers 550 can increase the damping forces, based on providing a smaller outlet for air to flow between the back cavity 525 and the front cavity to equalize the instantaneous pressure differential. Increasing the separation distance to increase the gap between adjacent cantilevers 550 can decrease the damping forces, based on providing a larger outlet for air to flow between the back cavity 525 and the front cavity to equalize the instantaneous pressure differential. Sufficiently large separation distances (e.g., gaps) between one or more pairs of adjacent cantilevers can result in the pressure remaining substantially equal across the back cavity 525 and the front cavity (e.g., back cavity coupling does not occur or is minimal). In some aspects, the separation distance (e.g., gap) between respective pairs of adjacent cantilevers of the plurality of cantilevers 550 can be below a threshold value for achieving back cavity coupling.

In some cases, one or more cantilevers of the plurality of cantilevers 550 can include one or more holes or apertures that extend from the back cavity 525 volume to the surrounding volume enclosed by lid 507, where the holes or apertures allow air to flow from one volume to another. For instance, the holes or apertures can provide airflow between the back cavity 525 volume and the front cavity volume (e.g., the volume enclosed by the lid 507). In some aspects, the airflow through the holes or apertures included on one or more cantilevers of the plurality of cantilevers 550 can be in addition to the airflow through the gaps between adjacent cantilevers of the plurality of cantilevers 550, and may be used to implement fine-tuning of the back cavity coupling and/or corresponding damping of the plurality of cantilevers 550.

In some examples, back cavity coupling and the damping of the plurality of cantilevers 550 can be controlled and/or configured based on varying the separation distance (e.g., gaps) between respective pairs of adjacent cantilevers of the plurality of cantilevers 550. Different pairs of adjacent cantilevers may be associated with different separation distances (e.g., non-uniform separation distances/gaps can be configured for the plurality of cantilevers 550). In some aspects, the plurality of cantilevers 550 can be configured with a uniform separation distance (e.g., gap size) between each pair of adjacent cantilevers, and the back cavity coupling and damping can be more precisely set or controlled using one or more holes or apertures provided on at least a portion of the plurality of cantilevers 550. For example, the size (e.g., diameter), quantity, location, etc., of the one or more holes or apertures included in the plurality of cantilevers 550 can be used to more precisely control the damping and back pressure coupling. In some examples, back cavity coupling and damping can be configured based on a combination of separation distance (e.g., gap size) between adjacent cantilevers of the plurality of cantilevers 550 and the inclusion of one or more holes or apertures on at least a portion of the plurality of cantilevers 550.

Figure 6A:
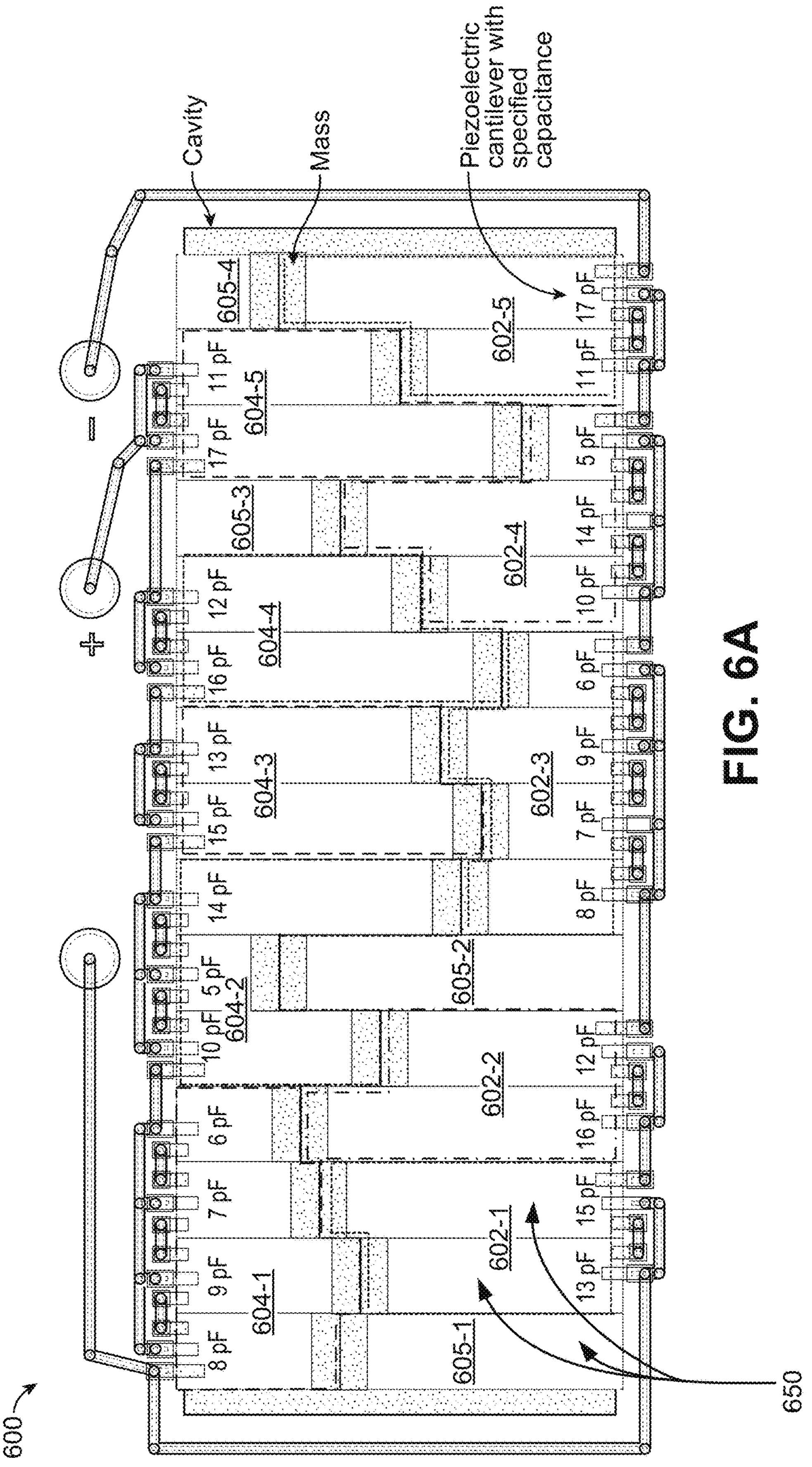
FIG. 6A is a diagram illustrating an example wiring configuration between a plurality of sensing elements of a multi-band VA, in accordance with some examples.
Figure 6B:
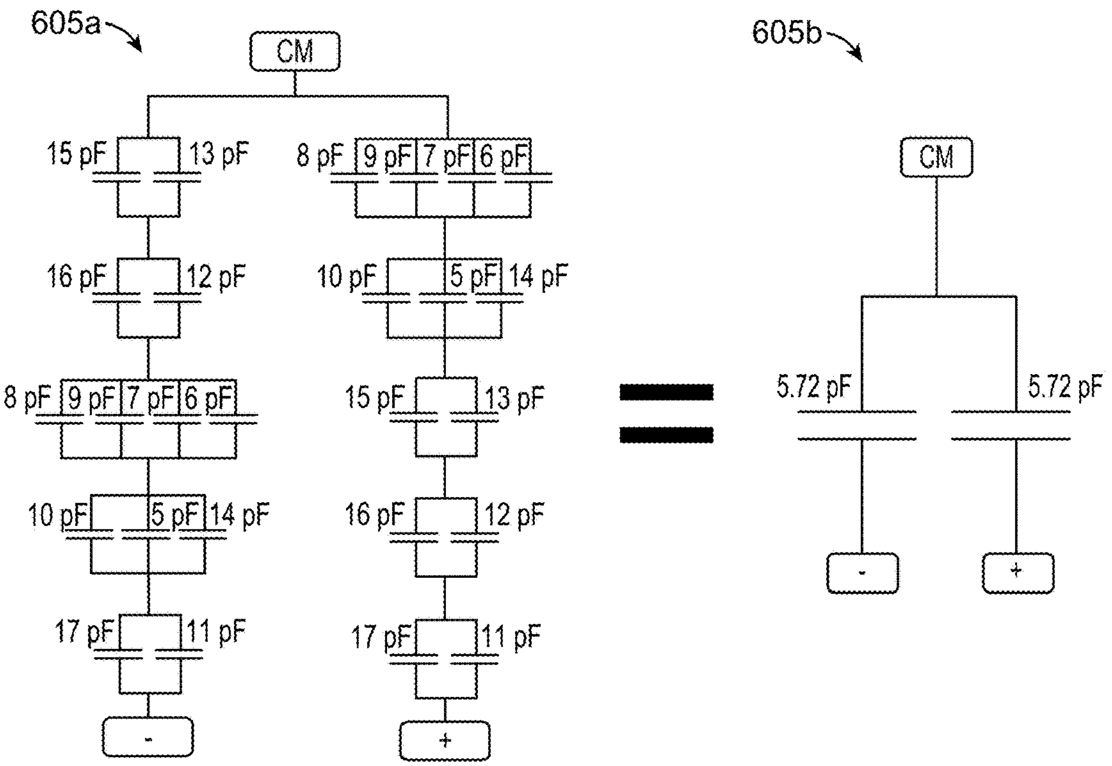
FIG. 6B illustrates two equivalent circuit diagrams for the MEMS capacitance of the multi-band VA wiring configuration of FIG. 6A, in accordance with some examples.
Figure 6C:
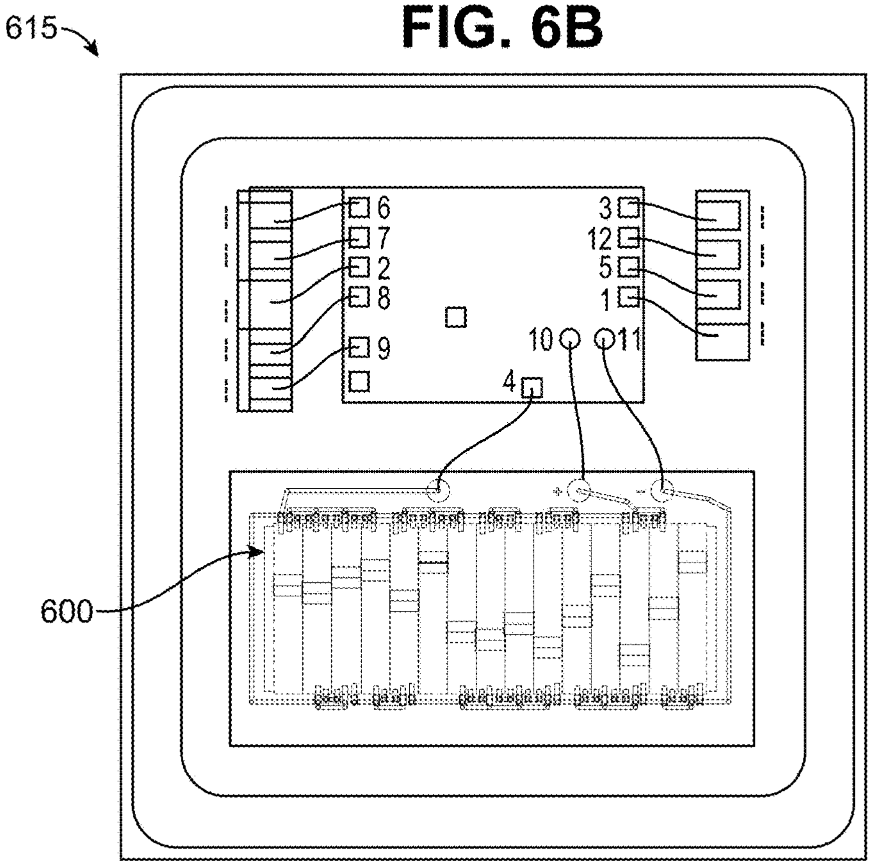
FIG. 6C is a diagram illustrating an example connection between the multi-band VA wiring configuration of FIG. 6A and an Application Specific Integrated Circuit (ASIC) connection interface, in accordance with some examples.
Figure 6D:
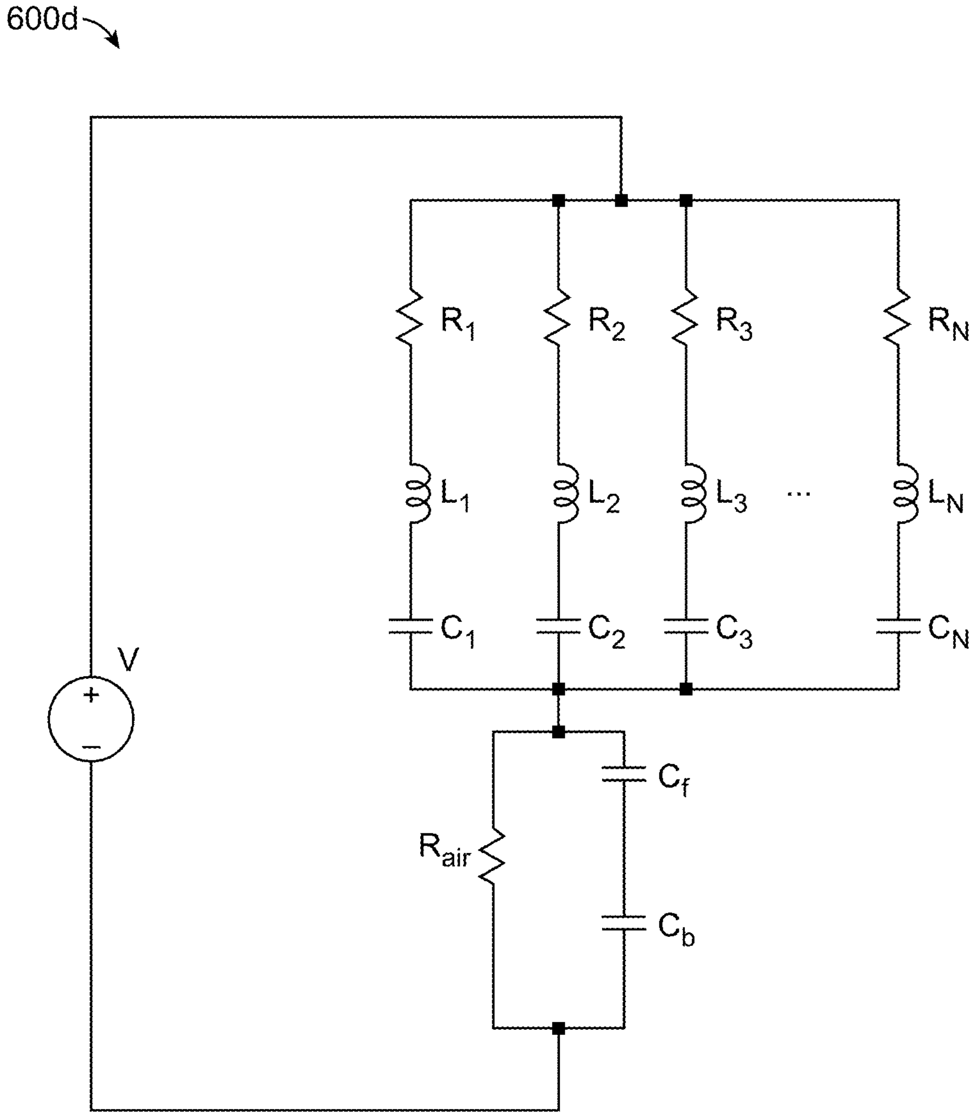
FIG. 6D is a diagram illustrating an example equivalent circuit of a multi-band VA, in accordance with some examples.

In some examples, the plurality of cantilevers 550 can be simulated based on an equivalent circuit model, such as the example equivalent circuit model 600*d* of FIG. 6D. Each cantilever can be represented with a respective branch of a plurality of parallel branches 1, 2, . . . , N (e.g., equivalent circuit model 600 corresponds to a plurality of cantilevers that includes a total of N cantilevers). Each parallel branch used to represent a respective cantilever includes a respective inductance value $L_i$ (e.g., representing a mass associated with the i-th cantilever), a respective capacitance value $C_i$ (e.g., representing a stiffness associated with the i-th cantilever), and a respective resistance value $R_i$ (e.g., representing a damping associated with the i-th cantilever), where $i \in 1, 2, \ldots, N$. A $C_f$ capacitance value represents the acoustic stiffness of the front cavity volume (e.g., volume enclosed by the lid 507 of FIG. 5). A $C_b$ capacitance value represents the acoustic stiffness of the back cavity volume under the cantilevers 550 of FIG. 5 (e.g., the back cavity 525 volume). The equivalent circuit model 600*d* additionally includes an $R_{air}$ resistance value that represents the damping corresponding to air flowing from one volume to another (e.g., from the back cavity to the front cavity and vice versa, through the gaps between adjacent cantilevers and/or holes or apertures provided on one or more cantilevers).

As noted above, the multi-band piezoelectric MEMS VA 500 can include the back cavity 525 and the plurality of cantilevers 550 configured to implement back cavity pressure coupling across the plurality of cantilevers 550. Boyle's law provides:

$$P\left(V_0 - \sum_{i=1}^{N} A_i x_i\right) = P_0 V_0 \qquad \text{Eq. (1)}$$

Here, $V_0$ represents the back cavity volume (e.g., the volume enclosed by back cavity 525 and the plurality of cantilevers 550). $P_0$ is a static pressure term, and may be representative of atmospheric pressure and/or the static pressure within the enclosed volume of lid 507 outside of the back cavity 525 (e.g., $P_0$ can represent the front cavity pressure). In some cases, $P_0$ can be equal to or approximated as equal to atmospheric pressure. The lid 507 of FIG. 5 may include one or more vents (e.g., holes, apertures, etc.) to balance the pressure within the volume enclosed by lid 507 (e.g., front cavity pressure) with the external pressure outside of lid 507 (e.g., atmospheric pressure). The term $x_i$ represents the displacement of the $i^{th}$ cantilever into or out of the back cavity volume 525 (e.g., in the perspective view of FIG. 5B, a first direction of cantilever displacement is toward the PCB 505/into the back cavity volume 525; a second direction of cantilever displacement is toward the lid 507/away from the back cavity volume 525).

Balancing static pressure yields a force $f_i$ that acts on the $i^{th}$ cantilever of the plurality of cantilevers 550:

$$f_i = -(P - P_0)A_i \qquad \text{Eq. (2)}$$

Here, $A_i$ represents an effective area of the $i^{th}$ cantilever, which may be proportional to the mass of the $i^{th}$ cantilever. The effective area can be the area of the cantilever that is exposed to the back cavity volume (e.g., the area of the cantilever upon which the back cavity pressure force acts). In some aspects, the cantilever may bend along its longitudinal length as the cantilever oscillates (e.g., the cantilever is not perfectly rigid), and the effective area of the cantilever can be slightly smaller than the corresponding surface area of the cantilever.

Eq. (2) can be rewritten as follows:

$$f_i = -A_i\left(\frac{P_0 V_0}{V_0 - \Sigma A_i x_i} - P_0\right) \qquad \text{Eq. (3)}$$

Eq. (3) can be rewritten as:

$$f_i = -A_i\left(\frac{P_0\Sigma A_i x_i}{V_0 - \Sigma A_i x_i}\right) \quad \text{Eq. (4)}$$

Based on the assumption $\Sigma A_i x_i << V_0$ (e.g., the cumulative volume delta over the plurality of cantilevers 550 while oscillating is significantly smaller than the back cavity volume 525), the force on each cantilever can be rewritten as:

$$f_i = -A_i\Sigma A_i x_i\frac{P_0}{V_0} \quad \text{Eq. (5)}$$

Eq. (5) indicates that each cantilever i of the plurality of cantilevers 550 contributes to the back cavity pressure (e.g., $P_0$) associated with back cavity 525, where the contribution of each individual cantilever is expressed in the $A_i x_i$ term. Additionally, each cantilever i of the plurality of cantilevers 550 is influenced by a resulting pressure force corresponding to the back cavity pressure, with the resulting pressure force $f_i$ for each cantilever 550 given in Eq. (5). Based on each cantilever contributing to the back cavity instantaneous pressure and based on each cantilever additionally experiencing a resulting pressure force corresponding to the back cavity instantaneous pressure, the plurality of cantilevers 550 are coupled to one another while the cantilevers oscillate during operation of multi-band MEMS VA 500 to sense bone-conducted sound. The dynamic back cavity pressure can be determined as $$\Sigma A_i x_i\frac{P_0}{V_{0_i}},$$

and can exert a coupling force $f_i$ on each cantilever i of the plurality of cantilevers 550, where the coupling force $f_i$ of Eq. (5) is proportional to the cantilever area (e.g., $A_i$) and inversely proportional to the volume of back cavity 525 (e.g., $V_0$).

In one illustrative example, the back cavity pressure coupling implemented by piezoelectric MEMS VA 400 of FIG. 4 and/or piezoelectric MEMS VA 500 of FIGS. 5A and 5B can be used to further tune the frequency response of the piezoelectric MEMS VA within a detectable or usable voice vibration band that can be sensed using the piezoelectric MEMS VA. For instance, the back cavity pressure coupling can be used to strategically increase the sensitivity of the MEMS VA 500 in one or more frequency regions (e.g., 1.2 kHz) for improved voice pickup in the bone-conducted sound signal generated by the MEMS VA 500. The back cavity pressure coupling implemented by piezoelectric MEMS VA 400 of FIG. 4 and/or piezoelectric MEMS VA 500 of FIGS. 5A and 5B can additionally be used to increase the detectable voice vibration band (e.g., frequency range) in which bone-conducted voice can be sensed. For instance, as noted above, existing MEMS VA implementations may be configured to detect bone-conducted sound in the band of 100 Hz to 1 kHz, as the bone-conducted voice signal drops into the noise floor and becomes undetectable by the existing MEMS VA implementations for frequencies greater than 1 kHz. In one illustrative example, the systems and techniques described herein can be used to implement a piezoelectric MEMS VA with increased SNR (e.g., such as the piezoelectric MEMS VA 400 of FIG. 4 and/or piezoelectric MEMS VA 500 of FIGS. 5A and 5B). The increased SNR piezoelectric MEMS VA can be used to sense or detect vibration energy beyond 1 kHz. In some aspects, the higher frequency (e.g., greater than 1 kHz) can correspond to a bone-conducted voice signal that sounds less muffled and is better suited for voice enhancement and/or other audio or signal processing operations.

Figure 7:
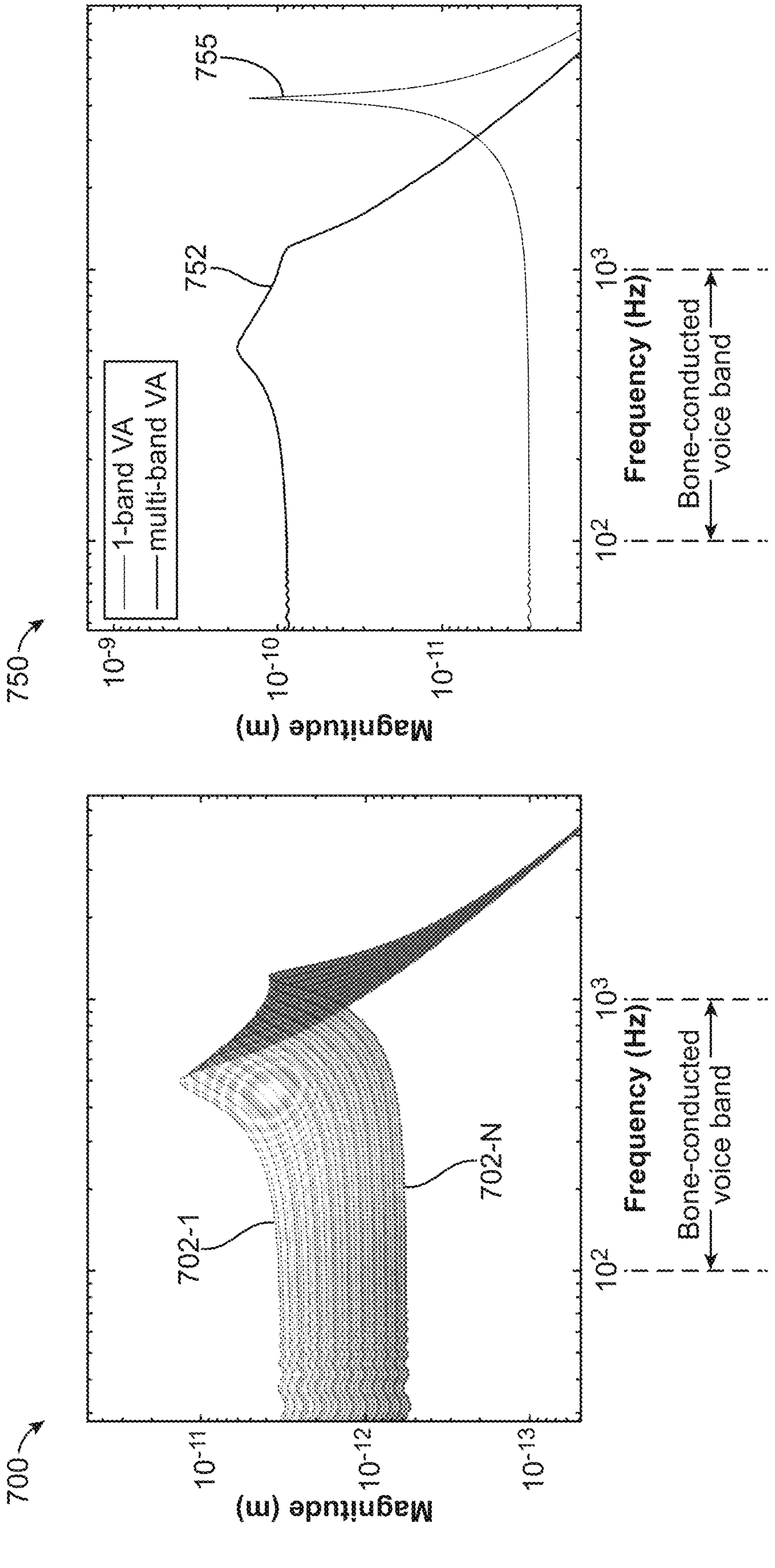
FIG. 7 is a diagram depicting frequency responses of an example multi-band VA and an example single-band VA over a bone-conducted voice band (e.g., frequency range), in accordance with some examples.

For instance, FIG. 7 is a diagram depicting an example graph of a frequency response 700 of an example multi-band MEMS VA that does not implement back cavity air pressure coupling (e.g., a multi-band MEMS VA with an open back cavity or the gaps between cantilevers are very big). The frequency response 700 includes a respective frequency response 702-1, . . . , 702-N for each of N cantilevers included in the example multi-band MEMS VA with the open back cavity. The graph 750 depicts the combined frequency response 752 corresponding to the combination of the plurality of individual cantilever frequency responses 702-1, . . . , 702-N. Graph 750 additionally depicts a frequency response 755 corresponding to a single band MEMS VA (e.g., a conventional MEMS VA using a plurality of cantilevers of identical dimensions and therefore identical resonance peaks). For instance, frequency response 755 can correspond to an existing single-band MEMS VA using a plurality of identical cantilevers with relatively large gaps between adjacent cantilevers. The example single-band MEMS VA associated with frequency response 755 has a very low damping factor, corresponding to the sharp resonance peak at approximately 4 kHz within the frequency response 755. The respective frequency responses 702-1, . . . , 702-N within the multi-band MEMS VA frequency response 700 are associated with cantilevers with higher damping factors (e.g., where the higher damping factors are based on smaller separation/gap size between adjacent cantilevers of the multi-band MEMS VA associated with frequency response 700). The single-band MEMS VA frequency response 755 has a resonance at 4 kHz in order to achieve a relatively flat frequency response within its configured bone-conducted voice vibration band of 100 Hz to 1 kHz. The individual frequency responses 702-1, . . . , 702-N of the multi-band MEMS VA frequency response 700 need not be flat within their configured bone-conducted voice vibration band (which can be wider than 100 Hz to 1 kHz, as noted previously above), as the individual frequency responses are configured to provide the combined frequency response 700 having a desired sensitivity and shape (e.g., relatively flat, equalized for improved voice pickup at particular frequencies, etc.).

As seen in the example multi-band MEMS VA frequency response graph 700, the plurality of cantilevers are configured to provide a corresponding plurality of resonance peaks across the bone-conducted voice vibration band (e.g., each respective cantilever frequency response 702-1, . . . , 702-N has a different resonance peak, corresponding to each respective cantilever having a different physical configuration and different resonance frequency and/or characteristics). As seen in the example combined frequency response graph 750, the open back cavity MEMS VA is associated with a frequency response 752 that is significantly more sensitive across the full width of the bone-conducted voice vibration band, while the single-band MEMS VA frequency response 755 concentrates sensitivity to a single resonance peak located well beyond the bone-conducted voice vibration band. In some aspects, the combined or total frequency response 752 of the open back cavity MEMS VA can be indicative of greater than 20 dB improvement in sensitivity within the bone-conducted voice vibration band, over the existing single-band MEMS VA frequency response 755.

Figure 8:
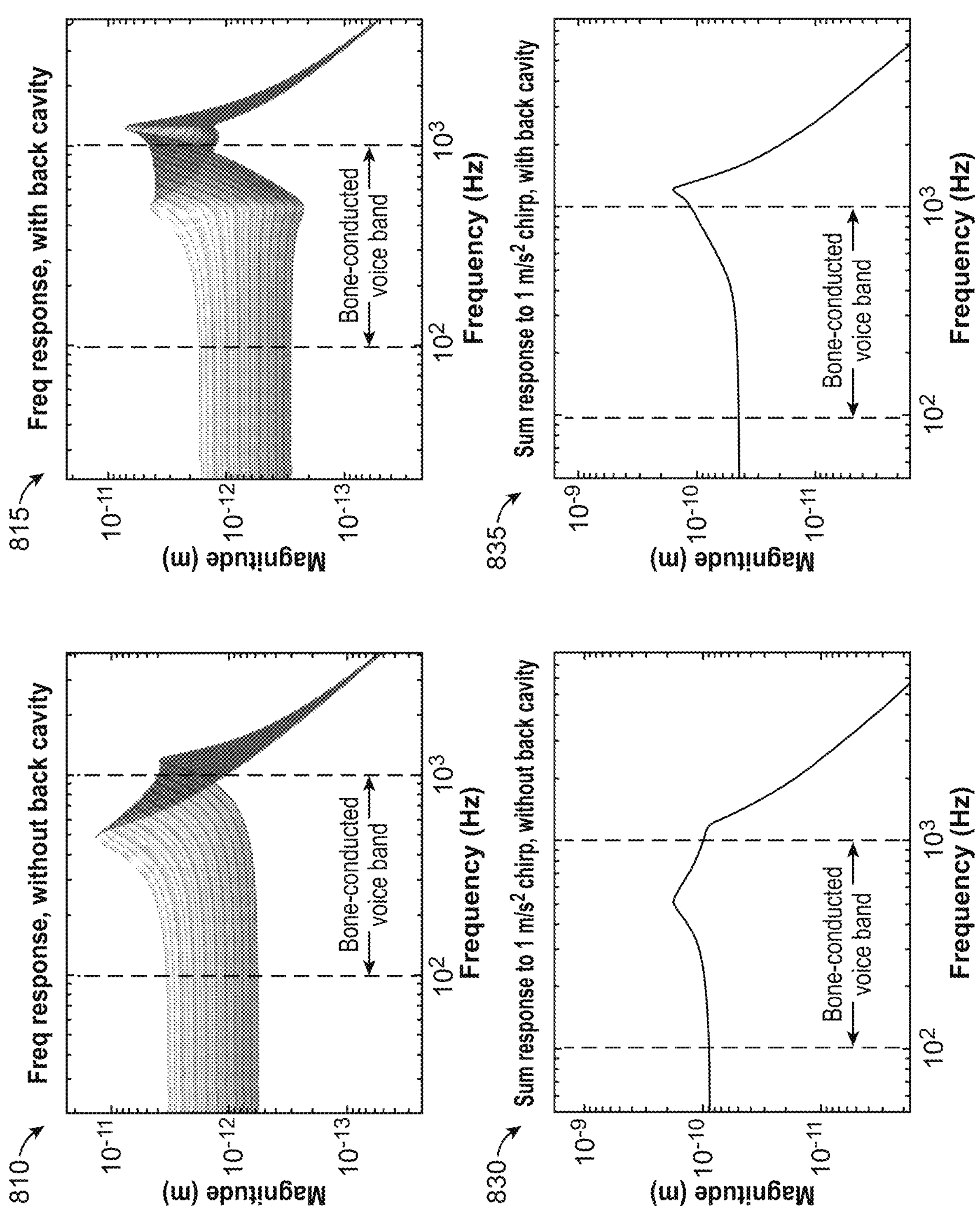
FIG. 8 is a diagram depicting respective frequency responses of an example multi-band VA without back cavity air pressure coupling and respective frequency responses of an example multi-band VA with back cavity air pressure coupling, in accordance with some examples.

FIG. 8 is a diagram depicting respective frequency response information of an example open back cavity MEMS VA and respective frequency response information of an example back cavity pressure coupled MEMS VA. For example, the open back cavity MEMS VA frequency response information can include the individual frequency responses of graph 810 (e.g., which may be the same as frequency response graph 700 of FIG. 7) and the combined frequency response of graph 830. The open back cavity MEMS VA combined frequency response of graph 830 can be the same as or similar to the open back cavity MEMS VA combined frequency response 752 of graph 750 of FIG. 7.

Corresponding frequency response information is depicted in graphs 815 and 835 for the example back cavity pressure coupled MEMS VA. For example, individual cantilever frequency responses are depicted in graph 815 and the corresponding combined frequency response is depicted in graph 835. In one illustrative example, the example back cavity pressure coupled MEMS VA associated with frequency response graphs 815 and 835 can be the same as or similar to the multi-band piezoelectric MEMS VA 500 of FIGS. 5A and 5B. In some aspects, the example back cavity pressure coupled MEMS VA associated with frequency response graphs 815 and 835 may additionally be the same as or similar to the multi-band piezoelectric MEMS VA 400 of FIG. 4, with the separation (e.g. gap size) between adjacent cantilevers configured below the threshold value(s) associated with implementing back cavity coupling.

Graph 815 depicts individual frequency responses for each cantilever of a plurality of cantilevers (e.g., cantilever 550 of FIGS. 5A-B) included in the back cavity pressure coupled MEMS VA (e.g., MEMS VA 500 of FIGS. 5A-B). Based on the back cavity air pressure coupling, a flatter frequency response, and more consistent sensitivity to bone-conducted sound, can be achieved over the voice vibration band. For instance, the back cavity air pressure coupling can increase the variance between various pairs of cantilever frequency responses. For instance, the back cavity air pressure coupling can increase the variance between arbitrary pairs of cantilever frequency responses (e.g., with "arbitrary" referring to a non-fixed or non-static relationship between the individual cantilever responses, instantaneously and/or over time). For example, various features of an individual cantilever response included in graph 815 (e.g., such as the double peaks of some individual cantilever responses, etc.) can be based on the interaction of the motions (e.g., oscillations) of the combined plurality of cantilevers corresponding to the set of individual responses in graph 815. In one illustrative example, the back cavity air pressure coupling can be used to increase the differentiation and variability between respective pairs or subsets of the plurality of individual cantilever frequency responses 815, as the back cavity coupling can be configured such that all cantilevers no longer follow the same trend in their respective individual frequency responses. In some aspects, the back cavity air pressure coupling can be used to control the damping of the individual piezoelectric MEMS cantilevers to set the damping factors to optimal or desired values. For instance, an independent cantilever (e.g., a cantilever included in a piezoelectric MEMS VA with an open back cavity design and large separation gaps between adjacent cantilevers) may be associated with relatively low damping. Too little damping can correspond to a very narrow resonance peak in the frequency response of the piezoelectric MEMS VA. In one illustrative example, the systems and techniques described herein can implement back cavity air pressure coupled cantilevers with configured back cavity size and configured gap size between adjacent cantilevers to set the damping factors to optimal values, providing an effective way to shape the frequency responses of each cantilever and the combined (e.g., total) frequency response of the cantilevers.

FIGS. 6A-C are diagrams illustrating example wiring configurations for connecting the respective outputs of a plurality of MEMS cantilevers and/or generating a bone-conducted sound signal output based on the respective outputs of the plurality of MEMS cantilevers. For example, FIG. 6A is a diagram illustrating an example wiring configuration 600 between a plurality of sensing elements (e.g., cantilevers) 650 of a multi-band VA, in accordance with some examples. The plurality of cantilevers 650 can be the same as or similar to the plurality of cantilevers 450 of FIG. 4 and/or the plurality of cantilevers 550 of FIGS. 5A-B. The multi-band VA corresponding to FIG. 6A can be the same as or similar to the multi-band piezoelectric MEMS VA 400 of FIG. 4 and/or the multi-band piezoelectric MEMS VA 500 of FIGS. 5A-B. FIG. 6B illustrates a first equivalent circuit diagram **605*a* and a second equivalent circuit diagram 605*b* for the MEMS capacitance of the multi-band VA wiring configuration 600 of FIG. 6A, in accordance with some examples. FIG. 6C is a diagram illustrating an example connection between the multi-band VA wiring configuration 600 of FIG. 6**A and an ASIC connection interface, in accordance with some examples.

In some aspects, the plurality of cantilevers 650 can include cantilevers of different physical dimensions and/or other physical properties (e.g., and corresponding different resonance frequencies), as described above. In some cases, the plurality of cantilevers 650 can additionally have different capacitances, such as the capacitance values depicted in FIG. 6A. Physically larger and/or longer cantilevers included in the plurality of cantilevers 650 may have higher capacitance values.

In some examples, the plurality of cantilevers 650 can be connected using the wiring configuration 600 in order to perform capacitance matching to the input (or expected input) of an ASIC or other audio signal processing engine associated with the multi-band piezoelectric MEMS VA. In some aspects, the capacitance matching can be used to provide an optimal capacitance to an ASIC for the best SNR. For instance, the wiring configuration 600 can be used to connect the plurality of cantilevers 650 (e.g., which may be the same as the plurality of cantilevers 550 of FIGS. 5A-B) such that an equivalent capacitance of the wiring configuration 600 matches an input capacitance of the ASIC 520 of FIGS. 5A-B.

In some aspects, the wiring configuration 600 includes a plurality of groupings of cantilevers that are wired in series (e.g., group 604-1, 604-2, 604-3, 604-4, 604-5, 602-1, 602-2, 602-3, 602-4, 602-5), with the plurality of groups 604 and 602 then wired in parallel. In some examples, the choice of grouping for each cantilever of the plurality of cantilevers 650 can be based on the respective cantilever lengths within each series-wired group. For instance, if the length of one cantilever of is too different from the lengths of its neighboring (e.g., adjacent) cantilevers, the gap that is created as the cantilevers deflect during oscillation becomes larger than otherwise (e.g., larger than if the lengths between adjacent cantilevers were more closely matched). A larger gap between cantilevers during deflection can affect damping. In some cases, a random grouping of the cantilevers 650 into the series-wired groups may increase the number of unused and/or unwired cantilevers, which may unnecessarily increase the die size. In some aspects, the wiring configuration 600 can be used to more efficiently utilize the die area, and a uniform size allows for easier gap control. In some aspects, the choice of series-wired groups each including a respective subset of the plurality of cantilevers 650 can be implemented based on capacitance matching and/or a capacitance matching target (e.g., a configured capacitance), such that the series-wired groups when wired in parallel have an equivalent capacitance that is equal to a capacitance matching target (e.g., configured capacitance). In some cases, due to capacitance matching, it may not be possible for the cantilevers to be arranged in a perfectly rectangular shape. One or more cantilevers may be unused and/or un-wired in order to preserve the back cavity air pressure coupling of the plurality of cantilevers 650 while also achieving the desired capacitance matching and/or capacitance matching target (e.g., configured capacitance). For instance, the wiring configuration 600 includes the unused cantilevers 605-1, 605-2, 605-3, and 605-4.

The equivalent circuit diagram 605*a* of FIG. 6B corresponds to the wiring configuration 600 of FIG. 6A and includes each of the individual cantilevers of the plurality of cantilevers 650, represented as a corresponding capacitance value in parallel and/or in series with another cantilever(s) capacitance(s). The equivalent circuit diagram 605*b* of FIG. 6B corresponds to the wiring configuration 600 of FIG. 6A, and is a reduced equivalent circuit of the equivalent circuit diagram 605*a* (e.g., collapsing the left and right branches of equivalent circuit diagram 605*a* into single equivalent capacitance values).

In the example of FIG. 6B, a total target capacitance of 2.5 picofarads (pF) may be associated with the wiring configuration 600 of FIG. 6A (e.g., the total target capacitance for ASIC 520 of FIGS. 5A-B may be 2.5 pF). The equivalent capacitance of the equivalent circuit diagram 605*b* is $$\frac{1}{\frac{1}{5.72}+\frac{1}{5.72}} = 2.86\text{ pF},$$

demonstrating that the wiring configuration 600 of FIG. 6A closely achieves the total target capacitance value (e.g., configured capacitance value) of 2.5 pF for the plurality of cantilevers 650.

In some examples, the wiring configuration 600 can be designed to connect the plurality of cantilevers 650 to a particular ASIC connection interface. For instance, the ASIC connection interface can be associated with the ASIC 520 of FIGS. 5A-B. In one illustrative example, the plurality of cantilevers 650 can be wired together (e.g., using the wiring configuration 600 of FIG. 6A) to produce a one channel output signal, rather than a respective signal from each cantilever of the plurality of cantilevers needing to be filtered and amplified individually.

In some examples, the processes described herein may be performed by a computing device or apparatus. In one example, the processes described herein may be performed by a wireless communication device. In one example, the processes described herein may be performed by a hearing device and/or wearable device that includes one or more multi-band VAs with a plurality of sensing elements (e.g., cantilevers) having different frequencies and coupled via a back cavity air pressure of the multi-band VA. For instance, the hearing device and/or wearable device can be the same as or similar to one or more of the device 115 of FIG. 1, the device 205 of FIG. 2, and/or the device 300 of FIG. 3, etc. In another example, the processes described herein may be performed by a computing device with the computing system architecture 900 shown in FIG. 9. For instance, a wireless communication device with the computing architecture shown in FIG. 9 may include the components of the multi-band VA and/or other audio devices and may implement the operations of processes described herein.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes described herein can include a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the processes described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
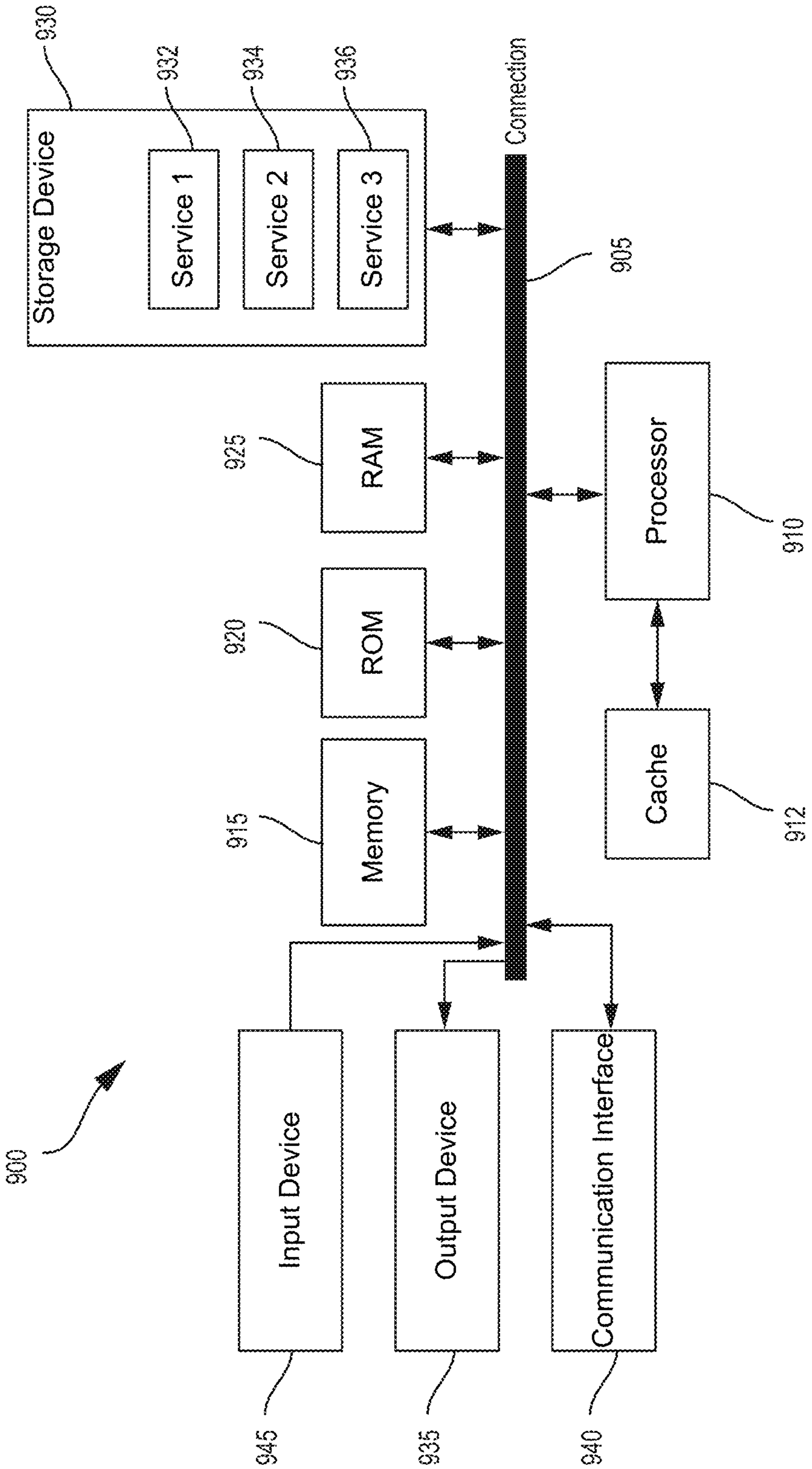
FIG. 9 is a block diagram illustrating an example of a computing system, in accordance with some examples.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some aspects, computing system 900 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 900 includes at least one processing unit (CPU or processor) 910 and connection 905 that communicatively couples various system components including system memory 915, such as read-only memory (ROM) 920 and random-access memory (RAM) 925 to processor 910. Computing system 900 may include a cache 912 of high-speed memory connected directly with, in close proximity to, or integrated as part of processor 910.

Processor 910 may include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some aspects, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

One of ordinary skill will appreciate that the less than (“<”) and greater than (“>”) symbols or terminology used herein may be replaced with less than or equal to (“≤”) and greater than or equal to (“≥”) symbols, respectively, without departing from the scope of this description.

Where components are described as being “configured to” perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” or “communicatively coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, A and B and C, or any duplicate information or data (e.g., A and A, B and B, C and C, A and A and B, and so on), or any other ordering, duplication, or combination of A, B, and C. The language “at least one of” a set and/or “one or more” of a set does not limit the set to the items listed in the set. For example, claim language reciting “at least one of A and B” or “at least one of A or B” may mean A, B, or A and B, and may additionally include items not listed in the set of A and B. The phrases “at least one” and “one or more” are used interchangeably herein.

Claim language or other language reciting “at least one processor configured to,” “at least one processor being configured to,” “one or more processors configured to,” “one or more processors being configured to,” or the like indicates that one processor or multiple processors (in any combination) can perform the associated operation(s). For example, claim language reciting “at least one processor configured to: X, Y, and Z” means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting “at least one processor configured to: X, Y, and Z” can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A voice accelerometer for detecting bone-conducted sound within a plurality of frequency bands, comprising: a substrate; a plurality of sensing elements associated with the plurality of frequency bands, wherein each frequency band of the plurality of frequency bands is associated with a corresponding one or more sensing elements of the plurality of sensing elements, each of the corresponding one or more sensing elements being associated with a respective resonance frequency within a respective frequency band; and a back cavity enclosed by the plurality of sensing elements and the substrate, wherein a volume of the back cavity extends between the plurality of sensing elements and the substrate, and wherein each respective sensing element of the plurality of sensing elements is configured to vibrate in response to: a first force corresponding to a bone-conducted sound wave coupled into the voice accelerometer; and a second force corresponding to a back cavity pressure coupling between the plurality of sensing elements, the back cavity pressure coupling based on respective vibration of each sensing element of the plurality of sensing elements.

Aspect 2. The voice accelerometer of Aspect 1, wherein the second force is a pressure force corresponding to a change in the volume of the back cavity.

Aspect 3. The voice accelerometer of Aspect 2, wherein the change in the volume of the back cavity is based on the plurality of sensing elements vibrating in response to the bone-conducted sound wave.

Aspect 4. The voice accelerometer of any of Aspects 2 to 3, wherein the change in the volume of the back cavity is proportional to an effective area of each sensing element of the plurality of sensing elements and a displacement of each sensing element of the plurality of sensing elements in response to the bone-conducted sound wave.

Aspect 5. The voice accelerometer of any of Aspects 2 to 4, wherein: the change in the volume of the back cavity is based on the plurality of sensing elements oscillating in response to the bone-conducted sound wave; and the back cavity pressure coupling is based on the change in the volume of the back cavity and a back cavity airflow through respective gaps between adjacent sensing elements of the plurality of sensing elements.

Aspect 6. The voice accelerometer of Aspect 5, wherein the second force is a damping force associated with a damping factor corresponding to the volume of the back cavity and the back cavity airflow through the respective gaps.

Aspect 7. The voice accelerometer of any of Aspects 1 to 6, wherein the back cavity is enclosed by the plurality of sensing elements based on a respective separation distance between adjacent sensing elements of the plurality of sensing elements being less than a threshold value.

Aspect 8. The voice accelerometer of any of Aspects 1 to 7, wherein the back cavity pressure coupling between the plurality of sensing elements is based on a respective separation distance between adjacent sensing elements of the plurality of sensing elements being less than a threshold value.

Aspect 9. The voice accelerometer of Aspect 8, wherein the back cavity pressure coupling between the plurality of sensing elements is based on an instantaneous pressure differential across the plurality of sensing elements.

Aspect 10. The voice accelerometer of Aspect 9, wherein the instantaneous pressure differential is a pressure difference between a back cavity pressure associated with the back cavity and a front cavity pressure associated with a front cavity of the voice accelerometer.

Aspect 11. The voice accelerometer of Aspect 10, wherein the front cavity is located opposite from the back cavity, and wherein the plurality of sensing elements are located between the back cavity and the front cavity.

Aspect 12. The voice accelerometer of any of Aspects 10 to 11, wherein the front cavity pressure is one or more of an atmospheric pressure or a static pressure.

Aspect 13. The voice accelerometer of any of Aspects 10 to 12, wherein the back cavity pressure is a dynamic pressure corresponding to a change in the volume of the back cavity, and wherein the change in the volume of the back cavity is based on oscillation of the plurality of sensing elements between the back cavity and the front cavity.

Aspect 14. The voice accelerometer of any of Aspects 1 to 13, wherein the plurality of sensing elements comprises a plurality of cantilevers associated with the back cavity.

Aspect 15. The voice accelerometer of Aspect 14, wherein the plurality of cantilevers are piezoelectric microelectromechanical systems (MEMS) cantilevers.

Aspect 16. The voice accelerometer of any of Aspects 14 to 15, wherein each respective cantilever of the plurality of cantilevers is coupled at a first distal end to the substrate and extends from the substrate into an empty volume of the back cavity.

Aspect 17. The voice accelerometer of any of Aspects 14 to 16, wherein the plurality of cantilevers are configured to implement a piezoelectric accelerometer for detecting bone-conducted sound within the plurality of frequency bands.

Aspect 18. The voice accelerometer of Aspect 17, wherein each respective frequency band of the plurality of frequency bands is associated with one or more cantilevers tuned to a respective resonance frequency corresponding to each respective frequency band.

Aspect 19. The voice accelerometer of any of Aspects 1 to 18, wherein: a first subset of sensing elements included in the plurality of sensing elements is associated with a first frequency band of the plurality of frequency bands, and wherein each sensing element of the first subset is associated with a respective resonance frequency within the first frequency band; and a second subset of sensing elements included in the plurality of sensing elements is associated with a second frequency band of the plurality of frequency bands, and wherein each sensing element of the second subset is associated with a respective resonance frequency within the second frequency band.

Aspect 20. The voice accelerometer of any of Aspects 1 to 19, wherein each respective sensing element of the plurality of sensing elements includes: a first longitudinal face perpendicular to a direction of vibration of the respective sensing element, the first longitudinal face located within the volume of the back cavity; and a second longitudinal face opposite the first longitudinal face, the second longitudinal face located within a volume of a front cavity enclosed by a housing of the voice accelerometer.

Aspect 21. The voice accelerometer of Aspect 20, wherein at least one sensing element of the plurality of sensing elements includes a respective aperture extending through the first longitudinal face and the second longitudinal face, the respective aperture including a first opening within the volume of the back cavity and a second opening within the volume of the front cavity.

Aspect 22. The voice accelerometer of Aspect 21, wherein the back cavity pressure coupling between the plurality of sensing elements is based on back cavity airflow between the back cavity and the front cavity through the respective aperture of each sensing element of the at least one sensing element.

Aspect 23. The voice accelerometer of Aspect 22, wherein a respective damping factor associated with each sensing element of the at least one sensing element is based at least in part on the back cavity airflow.

Aspect 24. The voice accelerometer of any of Aspects 1 to 23, wherein: each respective sensing element of the plurality of sensing elements generates a respective output signal corresponding to vibration of the respective sensing element; and the respective output signals are combined based on a wiring configuration between the plurality of sensing elements and an Application-Specific Integrated Circuit (ASIC), wherein the wiring configuration corresponds to a combined signal having a configured capacitance value for an optimal signal-to-noise ratio (SNR) with the ASIC.

Aspect 25. The voice accelerometer of Aspect 24, wherein the configured capacitance value of the wiring configuration is based on particular subsets of sensing elements with different respective resonance frequencies being connected in serial connections or parallel connections Aspect 26. The voice accelerometer of any of Aspects 24 to 25, wherein the wiring configuration combined signal generated from the plurality of sensing elements with different respective resonance frequencies comprises one single-ended signal or one differential signal for a single ASIC.

Aspect 27. An apparatus of a bone conduction microphone, comprising: a plurality of sensing elements associated with a plurality of frequency bands of a bone-conducted voice vibration range, each sensing element of the plurality of sensing elements corresponding to a respective frequency band of the plurality of frequency bands and associated with a resonance frequency within the respective frequency band; and a back cavity enclosed by the plurality of sensing elements and a substrate of the bone conduction microphone, wherein each respective sensing element of the plurality of sensing elements is configured to vibrate in response to: a first force corresponding to a bone-conducted sound wave coupled into the bone conduction microphone; and a second force corresponding to a back cavity pressure coupling between the plurality of sensing elements, the back cavity pressure coupling based on respective vibration of each sensing element of the plurality of sensing elements.

Aspect 28. The apparatus of Aspect 27, wherein the second force is a pressure force corresponding to a change in a volume of the back cavity.

Aspect 29. The apparatus of Aspect 28, wherein: the change in the volume of the back cavity is based on the plurality of sensing elements oscillating in response to the bone-conducted sound wave; and the back cavity pressure coupling is based on the change in the volume of the back cavity and a back cavity airflow through respective gaps between adjacent sensing elements of the plurality of sensing elements.

Aspect 30. The apparatus of any of Aspects 27 to 29, wherein the second force is a damping force associated with a damping factor corresponding to a volume of the back cavity and a back cavity airflow through a plurality of gaps between respective pairs of adjacent sensing elements of the plurality of sensing elements.

Aspect 31. The apparatus of any of Aspects 27 to 30, wherein the back cavity pressure coupling between the plurality of sensing elements is based on a respective separation distance between adjacent sensing elements of the plurality of sensing elements being less than a threshold value.

Aspect 32. The apparatus of any of Aspects 27 to 31, wherein the back cavity pressure coupling between the plurality of sensing elements is based on an instantaneous pressure differential between a back cavity pressure associated with the back cavity and a front cavity pressure associated with a front cavity volume enclosed by a housing of the bone conduction microphone.

Aspect 33. The apparatus of any of Aspects 27 to 32, wherein the plurality of cantilevers are piezoelectric microelectromechanical systems (MEMS) cantilevers.

Aspect 34. The apparatus of any of Aspects 27 to 33, wherein the second force is a pressure force corresponding to a change in a volume of the back cavity.

Aspect 35. The apparatus of Aspect 34, wherein the change in the volume of the back cavity is based on the plurality of sensing elements vibrating in response to the bone-conducted sound wave.

Aspect 36. The apparatus of any of Aspects 34 to 35, wherein the change in the volume of the back cavity is proportional to an effective area of each sensing element of the plurality of sensing elements and a displacement of each sensing element of the plurality of sensing elements in response to the bone-conducted sound wave.

Aspect 37. The apparatus of any of Aspects 34 to 36, wherein: the change in the volume of the back cavity is based on the plurality of sensing elements oscillating in response to the bone-conducted sound wave; and the back cavity pressure coupling is based on the change in the volume of the back cavity and a back cavity airflow through respective gaps between adjacent sensing elements of the plurality of sensing elements.

Aspect 38. The apparatus of Aspect 37, wherein the second force is a damping force associated with a damping factor corresponding to the volume of the back cavity and the back cavity airflow through the respective gaps.

Aspect 39. The apparatus of any of Aspects 27 to 38, wherein the back cavity is enclosed by the plurality of sensing elements based on a respective separation distance between adjacent sensing elements of the plurality of sensing elements being less than a threshold value.

Aspect 40. The apparatus of any of Aspects 27 to 39, wherein the back cavity pressure coupling between the plurality of sensing elements is based on a respective separation distance between adjacent sensing elements of the plurality of sensing elements being less than a threshold value.

Aspect 41. The apparatus of Aspect 40, wherein the back cavity pressure coupling between the plurality of sensing elements is based on an instantaneous pressure differential across the plurality of sensing elements.

Aspect 42. The apparatus of Aspect 41, wherein the instantaneous pressure differential is a pressure difference between a back cavity pressure associated with the back cavity and a front cavity pressure associated with a front cavity of the bone conduction microphone.

Aspect 43. The apparatus of Aspect 42, wherein the front cavity is located opposite from the back cavity, and wherein the plurality of sensing elements are located between the back cavity and the front cavity.

Aspect 44. The apparatus of any of Aspects 42 to 43, wherein the front cavity pressure is one or more of an atmospheric pressure or a static pressure.

Aspect 45. The apparatus of any of Aspects 42 to 44, wherein the back cavity pressure is a dynamic pressure corresponding to a change in the volume of the back cavity, and wherein the change in the volume of the back cavity is based on oscillation of the plurality of sensing elements between the back cavity and the front cavity.

Aspect 46. The apparatus of any of Aspects 27 to 45, wherein the plurality of sensing elements comprises a plurality of cantilevers associated with the back cavity.

Aspect 47. The apparatus of Aspect 46, wherein the plurality of cantilevers are piezoelectric microelectromechanical systems (MEMS) cantilevers.

Aspect 48. The apparatus of any of Aspects 46 to 47, wherein each respective cantilever of the plurality of cantilevers is coupled at a first distal end to the substrate and extends from the substrate into an empty volume of the back cavity.

Aspect 49. The apparatus of any of Aspects 46 to 48, wherein the plurality of cantilevers are configured to implement a piezoelectric accelerometer for detecting bone-conducted sound within the plurality of frequency bands.

Aspect 50. The apparatus of Aspect 4648 wherein each respective frequency band of the plurality of frequency bands is associated with one or more cantilevers tuned to a respective resonance frequency corresponding to each respective frequency band.

Aspect 51. The apparatus of any of Aspects 27 to 50, wherein: a first subset of sensing elements included in the plurality of sensing elements is associated with a first frequency band of the plurality of frequency bands, and wherein each sensing element of the first subset is associated with a respective resonance frequency within the first frequency band; and a second subset of sensing elements included in the plurality of sensing elements is associated with a second frequency band of the plurality of frequency bands, and wherein each sensing element of the second subset is associated with a respective resonance frequency within the second frequency band.

Aspect 52. The apparatus of any of Aspects 27 to 51, wherein each respective sensing element of the plurality of sensing elements includes: a first longitudinal face perpendicular to a direction of vibration of the respective sensing element, the first longitudinal face located within the volume of the back cavity; and a second longitudinal face opposite the first longitudinal face, the second longitudinal face located within a volume of a front cavity enclosed by a housing of the bone conduction microphone.

Aspect 53. The apparatus of Aspect 52, wherein at least one sensing element of the plurality of sensing elements includes a respective aperture extending through the first longitudinal face and the second longitudinal face, the respective aperture including a first opening within the volume of the back cavity and a second opening within the volume of the front cavity.

Aspect 54. The apparatus of Aspect 53, wherein the back cavity pressure coupling between the plurality of sensing elements is based on back cavity airflow between the back cavity and the front cavity through the respective aperture of each sensing element of the at least one sensing element.

Aspect 55. The apparatus of Aspect 54, wherein a respective damping factor associated with each sensing element of the at least one sensing element is based at least in part on the back cavity airflow.

Aspect 56. The apparatus of any of Aspects 27 to 55, wherein: each respective sensing element of the plurality of sensing elements generates a respective output signal corresponding to vibration of the respective sensing element; and the respective output signals are combined based on a wiring configuration between the plurality of sensing elements and an Application-Specific Integrated Circuit (ASIC), wherein the wiring configuration corresponds to a combined signal having a configured capacitance value for an optimal signal-to-noise ratio (SNR) with the ASIC.

Aspect 57. The apparatus of Aspect 56, wherein the configured capacitance value of the wiring configuration is based on particular subsets of sensing elements with different respective resonance frequencies being connected in serial connections or parallel connections Aspect 58. The apparatus of any of Aspects 56 to 57, wherein the wiring configuration combined signal generated from the plurality of sensing elements with different respective resonance frequencies comprises one single-ended signal or one differential signal for a single ASIC.

Aspect 59. The voice accelerometer of any of Aspects 1 to 26, wherein each of the corresponding one or more sensing elements is associated with the respective resonance frequency within the respective frequency band based on its length.

Aspect 60. The voice accelerometer of Aspect 59, wherein the plurality of sensing elements are sequentially arranged based on an increase or decrease of the length of the sensor elements.

Aspect 61. The apparatus of any of Aspects 27 to 58, wherein each of the corresponding one or more sensing elements is associated with the respective resonance frequency within the respective frequency band based on its length.

Aspect 62. The apparatus of Aspect 61, wherein the plurality of sensing elements are sequentially arranged based on an increase or decrease of the length of the sensor elements.

What is claimed is:

1. A voice accelerometer for detecting bone-conducted sound within a plurality of frequency bands, comprising:

a substrate;

a plurality of sensing elements associated with the plurality of frequency bands, wherein each respective frequency band of the plurality of frequency bands is associated with a corresponding one or more sensing elements of the plurality of sensing elements, each of the corresponding one or more sensing elements being associated with a respective resonance frequency within a respective frequency band, and wherein each respective sensing element of the plurality of sensing elements is configured to generate a respective output signal corresponding to vibration of the respective sensing element; and a back cavity enclosed by the plurality of sensing elements and the substrate, wherein a volume of the back cavity extends between the plurality of sensing elements and the substrate, and wherein each respective sensing element of the plurality of sensing elements is configured to vibrate in response to:

a first force corresponding to a bone-conducted sound wave coupled into the voice accelerometer; and a second force corresponding to a back cavity pressure coupling between the plurality of sensing elements, the back cavity pressure coupling based on respective vibration of each sensing element of the plurality of sensing elements, wherein the respective output signals are combined based on a wiring configuration between the plurality of sensing elements and an Application-Specific Integrated Circuit (ASIC) to generate a combined signal, wherein the wiring configuration corresponds to a combined signal having a configured capacitance value for an optimal signal-to-noise ratio (SNR) with the ASIC.

2. The voice accelerometer of claim 1, wherein the second force is a pressure force corresponding to a change in the volume of the back cavity.

3. The voice accelerometer of claim 2, wherein the change in the volume of the back cavity is based on the plurality of sensing elements vibrating in response to the bone-conducted sound wave.

4. The voice accelerometer of claim 2, wherein the change in the volume of the back cavity is proportional to an effective area of each sensing element of the plurality of sensing elements and a displacement of each sensing element of the plurality of sensing elements in response to the bone-conducted sound wave.

5. The voice accelerometer of claim 2, wherein:

the change in the volume of the back cavity is based on the plurality of sensing elements oscillating in response to the bone-conducted sound wave; and the back cavity pressure coupling is based on the change in the volume of the back cavity and a back cavity airflow through respective gaps between adjacent sensing elements of the plurality of sensing elements.

6. The voice accelerometer of claim 5, wherein the second force is a damping force associated with a damping factor corresponding to the volume of the back cavity and the back cavity airflow through the respective gaps.

7. The voice accelerometer of claim 1, wherein the back cavity is enclosed by the plurality of sensing elements based on a respective separation distance between adjacent sensing elements of the plurality of sensing elements being less than a threshold value.

8. The voice accelerometer of claim 1, wherein the back cavity pressure coupling between the plurality of sensing elements is based on a respective separation distance between adjacent sensing elements of the plurality of sensing elements being less than a threshold value.

9. The voice accelerometer of claim 8, wherein the back cavity pressure coupling between the plurality of sensing elements is based on an instantaneous pressure differential across the plurality of sensing elements.

10. The voice accelerometer of claim 9, wherein the instantaneous pressure differential is a pressure difference between a back cavity pressure associated with the back cavity and a front cavity pressure associated with a front cavity of the voice accelerometer.

11. The voice accelerometer of claim 10, wherein the front cavity is located opposite from the back cavity, and wherein the plurality of sensing elements are located between the back cavity and the front cavity.

12. The voice accelerometer of claim 10, wherein the front cavity pressure is one or more of an atmospheric pressure or a static pressure.

13. The voice accelerometer of claim 10, wherein the back cavity pressure is a dynamic pressure corresponding to a change in the volume of the back cavity, and wherein the change in the volume of the back cavity is based on oscillation of the plurality of sensing elements between the back cavity and the front cavity.

14. The voice accelerometer of claim 1, wherein the plurality of sensing elements comprises a plurality of cantilevers associated with the back cavity.

15. The voice accelerometer of claim 14, wherein the plurality of cantilevers are piezoelectric microelectromechanical systems (MEMS) cantilevers.

16. The voice accelerometer of claim 14, wherein each respective cantilever of the plurality of cantilevers is coupled at a first distal end to the substrate and extends from the substrate into an empty volume of the back cavity.

17. The voice accelerometer of claim 14, wherein the plurality of cantilevers are configured to implement a piezoelectric accelerometer for detecting bone-conducted sound within the plurality of frequency bands.

18. The voice accelerometer of claim 17, wherein each respective frequency band of the plurality of frequency bands is associated with one or more cantilevers tuned to a respective resonance frequency corresponding to each respective frequency band.

19. The voice accelerometer of claim 1, wherein:

a first subset of sensing elements included in the plurality of sensing elements is associated with a first frequency band of the plurality of frequency bands, and wherein each sensing element of the first subset is associated with a respective resonance frequency within the first frequency band; and a second subset of sensing elements included in the plurality of sensing elements is associated with a second frequency band of the plurality of frequency bands, and wherein each sensing element of the second subset is associated with a respective resonance frequency within the second frequency band.

20. The voice accelerometer of claim 1, wherein each respective sensing element of the plurality of sensing elements includes:

a first longitudinal face perpendicular to a direction of vibration of the respective sensing element, the first longitudinal face located within the volume of the back cavity; and a second longitudinal face opposite the first longitudinal face, the second longitudinal face located within a volume of a front cavity enclosed by a housing of the voice accelerometer.

21. The voice accelerometer of claim 20, wherein at least one sensing element of the plurality of sensing elements includes a respective aperture extending through the first longitudinal face and the second longitudinal face, the respective aperture including a first opening within the volume of the back cavity and a second opening within the volume of the front cavity.

22. The voice accelerometer of claim 21, wherein the back cavity pressure coupling between the plurality of sensing elements is based on back cavity airflow between the back cavity and the front cavity through the respective aperture of each sensing element of the at least one sensing element.

23. The voice accelerometer of claim 22, wherein a respective damping factor associated with each sensing element of the at least one sensing element is based at least in part on the back cavity airflow.

24. The voice accelerometer of claim 1, wherein the configured capacitance value of the wiring configuration is based on particular subsets of sensing elements with different respective resonance frequencies being connected in serial connections or parallel connections.

25. The voice accelerometer of claim 1, wherein the combined signal generated from the plurality of sensing elements with different respective resonance frequencies comprises one single-ended signal or one differential signal for a single ASIC.

26. An apparatus of a bone conduction microphone, comprising:

a plurality of sensing elements associated with a plurality of frequency bands of a bone-conducted voice vibration range, each respective sensing element of the plurality of sensing elements corresponding to a respective frequency band of the plurality of frequency bands and associated with a resonance frequency within the respective frequency band, and wherein each respective sensing element of the plurality of sensing elements is configured to generate a respective output signal corresponding to vibration of the respective sensing element; and a back cavity enclosed by the plurality of sensing elements and a substrate of the bone conduction microphone, wherein each respective sensing element of the plurality of sensing elements is configured to vibrate in response to:

a first force corresponding to a bone-conducted sound wave coupled into the bone conduction microphone; and a second force corresponding to a back cavity pressure coupling between the plurality of sensing elements, the back cavity pressure coupling based on respective vibration of each sensing element of the plurality of sensing elements, wherein the respective output signals are combined based on a wiring configuration between the plurality of sensing elements and an Application-Specific Integrated Circuit (ASIC) to generate a combined signal, wherein the wiring configuration corresponds to a combined signal having a configured capacitance value for an optimal signal-to-noise ratio (SNR) with the ASIC.

27. The apparatus of claim 26, wherein the second force is a pressure force corresponding to a change in a volume of the back cavity.

28. The apparatus of claim 27, wherein:

the change in the volume of the back cavity is based on the plurality of sensing elements oscillating in response to the bone-conducted sound wave; and the back cavity pressure coupling is based on the change in the volume of the back cavity and a back cavity airflow through respective gaps between adjacent sensing elements of the plurality of sensing elements.

29. The apparatus of claim 26, wherein the second force is a damping force associated with a damping factor corresponding to a volume of the back cavity and a back cavity airflow through a plurality of gaps between respective pairs of adjacent sensing elements of the plurality of sensing elements.

* * * * *